United States Patent
Gates

(10) Patent No.: US 7,202,847 B2
(45) Date of Patent: Apr. 10, 2007

(54) VOLTAGE MODULATED DRIVER CIRCUITS FOR ELECTRO-OPTIC DISPLAYS

(75) Inventor: Holly G. Gates, Somerville, MA (US)

(73) Assignee: E Ink Corporation, Cambridge, MA (US)

(*) Notice: Subject to any disclaimer, the term of this patent is extended or adjusted under 35 U.S.C. 154(b) by 271 days.

(21) Appl. No.: 10/609,119

(22) Filed: Jun. 27, 2003

(65) Prior Publication Data

US 2004/0075634 A1  Apr. 22, 2004

Related U.S. Application Data

(60) Provisional application No. 60/392,245, filed on Jun. 28, 2002.

(51) Int. Cl.
*G09G 3/36* (2006.01)
(52) U.S. Cl. ............... 345/98; 345/89; 345/204; 345/691; 345/692
(58) Field of Classification Search ............ 345/98, 345/89, 204, 691–692
See application file for complete search history.

(56) References Cited

U.S. PATENT DOCUMENTS

| | | | |
|---|---|---|---|
| 3,612,758 A | 10/1971 | Evans et al. | |
| 3,972,040 A | 7/1976 | Hilsum et al. | |
| 4,203,106 A | 5/1980 | Dalisa et al. | |
| 4,499,488 A * | 2/1985 | White et al. | 348/263 |
| 4,500,880 A | 2/1985 | Gomersall et al. | |
| 4,686,524 A | 8/1987 | White | |
| 4,821,291 A | 4/1989 | Stevens et al. | |
| 4,937,586 A | 6/1990 | Stevens et al. | |
| 4,962,466 A | 10/1990 | Revesz et al. | |
| 5,155,607 A | 10/1992 | Inoue et al. | |
| 5,179,517 A | 1/1993 | Sarbin et al. | |
| 5,238,861 A | 8/1993 | Morin et al. | |
| 5,254,981 A | 10/1993 | Disanto et al. | |
| 5,258,864 A | 11/1993 | Shannon | |
| 5,389,945 A | 2/1995 | Sheridon | |
| 5,402,145 A | 3/1995 | DiSanto et al. | |
| 5,467,107 A | 11/1995 | DiSanto et al. | |

(Continued)

FOREIGN PATENT DOCUMENTS

EP    0 460 747 A2    12/1991

(Continued)

OTHER PUBLICATIONS

Beilin, et al.; 8.5: 2000-Character Electrophoretic Display; Jan. 1, 1986; 136-40; SID 86 Digest.

(Continued)

*Primary Examiner*—Richard Hjerpe
*Assistant Examiner*—Leonid Shapiro
(74) *Attorney, Agent, or Firm*—David J. Cole

(57) ABSTRACT

A method and system for applying addressing voltages to pixels of a display involves receiving input data. The input data includes an indication of an addressing voltage impulse to be applied to a pixel via an electrode. One or more voltage sources are selected, to provide the addressing voltage impulse. The one or more voltage sources each have a pre-selected voltage. The selected one or more voltage sources are electrically connected to an electrode to apply the addressing voltage impulse to the pixel.

16 Claims, 10 Drawing Sheets

U.S. PATENT DOCUMENTS

| | | | |
|---|---|---|---|
| 5,528,399 A | 6/1996 | Izumi et al. | |
| 5,541,478 A | 7/1996 | Troxell et al. | |
| 5,561,443 A | 10/1996 | DiSanto et al. | |
| 5,602,572 A | 2/1997 | Rylander | |
| 5,627,561 A | 5/1997 | Laspina et al. | |
| 5,641,974 A | 6/1997 | den Boer et al. | |
| 5,684,501 A | 11/1997 | Knapp et al. | |
| 5,715,026 A | 2/1998 | Shannon | |
| 5,717,515 A | 2/1998 | Sheridon | |
| 5,739,801 A | 4/1998 | Sheridon | |
| 5,754,332 A | 5/1998 | Crowley | |
| 5,786,875 A | 7/1998 | Brader et al. | |
| 5,808,783 A | 9/1998 | Crowley | |
| 5,892,504 A | 4/1999 | Knapp | |
| 5,952,948 A * | 9/1999 | Proebsting | 341/144 |
| 5,978,052 A | 11/1999 | Ilcisin et al. | |
| 6,005,791 A | 12/1999 | Gudesen et al. | |
| 6,005,817 A | 12/1999 | Gudesen et al. | |
| 6,055,180 A | 4/2000 | Gudesen et al. | |
| 6,118,426 A | 9/2000 | Albert et al. | |
| 6,120,588 A | 9/2000 | Jacobson | |
| 6,124,851 A | 9/2000 | Jacobson | |
| 6,175,355 B1 * | 1/2001 | Reddy | 345/691 |
| 6,177,921 B1 | 1/2001 | Comiskey et al. | |
| 6,219,160 B1 | 4/2001 | Nordal et al. | |
| 6,232,950 B1 | 5/2001 | Albert et al. | |
| 6,252,564 B1 | 6/2001 | Albert et al. | |
| 6,422,687 B1 | 7/2002 | Jacobson | |
| 6,445,374 B2 | 9/2002 | Albert et al. | |
| 6,459,418 B1 | 10/2002 | Comiskey et al. | |
| 6,473,072 B1 | 10/2002 | Comiskey et al. | |
| 6,480,182 B2 | 11/2002 | Turner et al. | |
| 6,504,524 B1 | 1/2003 | Gates et al. | |
| 6,506,438 B2 | 1/2003 | Duthaler et al. | |
| 7,019,889 B2 * | 3/2006 | Katase | 359/296 |
| 2002/0021270 A1 | 2/2002 | Albert | |
| 2002/0180679 A1 * | 12/2002 | Kageyama et al. | 345/89 |

FOREIGN PATENT DOCUMENTS

| | | |
|---|---|---|
| EP | 0 595 812 B1 | 5/1994 |
| EP | 0 685 101 B1 | 12/1995 |
| EP | 0 717 446 A2 | 6/1996 |
| EP | 0 889 425 A1 | 1/1999 |
| EP | 0 717 446 A3 | 2/1999 |
| EP | 0 924 551 A1 | 6/1999 |
| FR | 2 693 005 | 12/1993 |
| JP | 6089081 | 3/1994 |
| JP | 2000-322001 | 11/2000 |
| WO | WO 93/02443 | 2/1993 |
| WO | WO 94/19789 | 9/1994 |
| WO | WO 95/07527 | 3/1995 |
| WO | WO 95/10107 | 4/1995 |
| WO | WO 97/01166 | 1/1997 |
| WO | WO 97/04398 | 2/1997 |
| WO | WO 97/48009 | 12/1997 |
| WO | WO 98/03896 | 1/1998 |
| WO | WO 98/41898 | 9/1998 |
| WO | WO 98/55897 | 12/1998 |
| WO | WO 98/58383 | 12/1998 |
| WO | WO 99/10768 | 3/1999 |
| WO | WO 99/10769 | 3/1999 |
| WO | WO 99/12170 | 3/1999 |
| WO | WO 99/14762 | 3/1999 |
| WO | WO 99/14763 | 3/1999 |
| WO | WO 99/47970 | 9/1999 |
| WO | WO 99/53371 | 10/1999 |
| WO | WO 99/59101 | 11/1999 |
| WO | WO 99/65011 | 12/1999 |
| WO | WO 99/65012 | 12/1999 |
| WO | WO 99/67678 | 12/1999 |
| WO | WO 00/36666 | 6/2000 |
| WO | WO 01/65309 A2 | 9/2001 |
| WO | WO 02/45061 A2 | 6/2002 |

OTHER PUBLICATIONS

Blazo, S.F.; 10.1/9:00 A.M.: High Resolution Electrophoretic Display with Photoconductor Addressing; Jan. 1, 1982; 92-93; SID 82 Digest.

Bohnke et al.; Polymer-Based Solid Electrochromic Cell for Matrix-Addressable Display Devices; Dec. 1, 1991; 3612-17; Journal of the Electrochemical Society; 138(12).

Chiang, A.; Reduction of Lateral Migration in Matrix Addressed Electrophoretic Display; Jan. 1, 1980; 73-74; Xerox Disclosure Journal; 5(1).

Comiskey et al.; 7.4L: Late-News Paper: Electrophoretic Ink: A Printable Display Material; Jan. 1, 1997; 75-76; SID 97 Digest.

Comiskey et al.; An Electrophoretic Ink for All-Printed Reflective Electronic Displays; Jul. 16, 1998; 253-55; Nature; 394.

Dalisa, A. L.; Electrophoretic Display Technology; Jul. 1, 1977; 827-34; IEEE Transactions on Electron Devices; 24(7).

Drzaic et al; A Printed and Rollable Bistable Electronic Display; Jan. 1, 1998; 1131-34; 1998 SID International Symposium, Digest of Technical Papers; 29.

Duthaler, G.M.; Design of a Drop-On-Demand Delivery System for Molten Solder Microdrops; Jan. 20, 1995; 1-73; Thesis, Department of Mechanical Engineering, Massachusetts Institute of Technology.

Hopper, et al.; An Electrophoretic Display, Its Properties, Model, and Addressing; Aug. 1, 1979; 1148-52; IEEE Transactions on Electron Devices; Ed-26, No. 8.

Jacobson et al.; The Last Book; Jan. 1, 1997; 457-463; IBM Systems Journa; 36(3).

Kobayashi et al.; A Novel Photo-Addressable Electronic Paper Using Organic Photoconductor utilizing Hydroxy Gallium Phthalocynine as Charge Generation Material; Jan. 1, 2001; 1731-32; Asia Display/IDW '01; AMD4-5 (Late-News Paper).

Lee, L. L.; Fabrication of Magnetic Particles Display; Jul. 1, 1977; 283-88; Proceeding of the S.I.D.; 18(3, 4).

Lee, L. L.; A Magnetic-Particles Display; Jul. 1, 1975; 177-184; Proceeding of the S.I.D.; 16(3).

Murau, P.; 9.4: Characteristics of an X-Y Addressed Electrophorectic Image Display (EPID); Jan. 1, 1984; 141; SID 84 Digest.

Ota et al.; Electrophoretic Display Devices; Jan. 1, 1975; 145-48; Laser 75 Optoelectronics Conference Proceedings.

Quon, W. S.; Multilevel Voltage Select (MLVS): A Novel Technique to X-Y Address an Electrophoretic Image Display; Aug. 1, 1977; 1121-23; IEEE Transactions on Electron Devices; 24(8).

Sheridon et al.; 10.2/9:25 A.M.: A Photoconductor-Addressed Electrophoretic Cell for Office Data Display; Jan. 1, 1982; 94-95; SID 82 Digest.

Shiffman et al.; An Electrophoretic Image Display with Internal NMOS Address Logic and Display Drivers; Jan. 1, 1984; 105-15; Proceedings of the SID; 25(2).

Singer et al.; An X-Y Addressable Electrophoretic Display; Jul. 1, 1977; 255-66; Proceeding of the S.I.D.

Toyama et al.; P-43: An Electrophoretic Matrix Display with External Logic and Driver Directly Assembled to the Panel; Jan. 1, 1994; 588-90; SID 1994 Digest.

Vaz et al.; Dual Frequency Addressing of Polymer-Dispensed Liquid-Crystal Films; Jun. 15, 1989; 5043-49; Journal of Applied Physics; 65(12).

Wisnieff, R.; Printing Screens; Jul. 16, 1998; 225, 227; Nature; 394.

* cited by examiner

VOLTAGE MODULATED DRIVER CIRCUITS FOR ELECTRO-OPTIC DISPLAYS

CROSS-REFERENCE TO RELATED APPLICATIONS

This application claims the benefit of U.S. Provisional Patent application Ser. No. 60/392,245, filed Jun. 28, 2002, the entire contents of which is herein incorporated by reference.

FIELD OF THE INVENTION

The present invention relates generally to electro-optic displays, and, more particularly, to methods and apparatus for active matrix addressing of such displays.

BACKGROUND OF THE INVENTION

Bistable or multi-stable particle-based electrophoretic displays, and other electro-optic displays, have an optical behavior that is distinct from the optical behavior of conventional liquid crystal displays ("LCDs"). Twisted nematic liquid crystals, for example, act as instantaneous voltage transducers, so that applying a given electric field to the liquid crystal display medium produces a specific gray level in response to the applied voltage, regardless of the gray level previously present at the pixel.

Further, LCDs are only driven in one direction (from non-transmissive or "dark" to transmissive or "light"). The reverse transition, i.e., from a lighter state to a darker, is effected by reducing or eliminating the electric field. Hence, common LCDs are continuously driven in order to maintain a desired image.

Common LCDs also have pixel gray levels that are not sensitive to the polarity of a driving electric field. Indeed, commercial LCDs usually reverse the polarity of the driving field at frequent intervals. In contrast, bistable electro-optic displays act as impulse transducers, so that the final state of a pixel depends not only upon the magnitude and time of application of an electric field, but also upon the state of the display medium prior to the application of the electric field.

A method of controlling and applying well defined voltage impulses to an electro-optic medium is required to produce desired optical states in the medium. There are several ways of providing a particular voltage impulse, e.g., a particular ∫Vdt value, to a display medium. Two common methods entail modulation of the length of a constant voltage pulse, and modulation of the amplitude of a constant length pulse.

Amplitude modulation methods are commonly employed because such methods can provide, for example, reduced power consumption and reduced controller complexity. When an insufficient range of impulse control is possible using only amplitude modulation, amplitude modulation can be combined with time modulation to produce a more precise modulation of the total impulse applied to a display medium.

To control amplitude modulation at the pixel level in an active matrix display, a column driver circuit is typically required to adjust the amplitude of the driver circuit's output based on display signal data received from a display controller. A row driver circuit sequentially selects each row of pixels, temporarily connecting a selected row of pixel electrodes to the column driver circuits. In this way, the voltage of applied to each pixel electrode in the display can be set once per scan by the column and row drivers.

A column driver circuit commonly includes a resistive digital-to-analog converter (R-DAC) system with output buffers and offset trimming. Although a DAC-based architecture has many benefits, it typically requires a large number of transistors for implementation. This can lead to two problems: 1) the implementation of the circuit can be complex with care required to insure proper functionality and accuracy; and 2) a large area of active circuit can be required, which can lead to higher cost (especially at higher voltages.)

For example, a LCD having 256 gray levels may include a separate 256-level DAC for each column of display elements. Each DAC converts digital image data supplied to a column driver into a voltage to be applied to a pixel electrode. The cost of a large number of DACs in a high-resolution display may increase the manufacturing cost of a display.

Further, fabrication of an R-DAC-based design may require specialized process provisions, such as a floating polycrystalline silicon capacitor layer, to enable design features which improve accuracy. Specialized processes may reduce the number of vendors available with a suitable manufacturing capability and may increase final cost as well as the complexity and cost of designing the architecture.

SUMMARY OF THE INVENTION

In broad overview, the invention involves display addressing architectures that utilize numerical data signals to apply addressing voltage impulses to pixels in the display without digital-to-analog conversion of the numerical data into a voltage impulse. According to principles of the invention, a display signal is used, for example, by a driver and related circuitry, to select voltage sources to provide a desired voltage impulse. The voltage sources can be, for example, one or more voltage rails.

A voltage impulse can be applied to a portion of a display medium defined by a pixel electrode, in part, by selecting one or more voltage sources, such as voltage rails, to provide a voltage of an amplitude indicated by the display signal, and by applying the voltage amplitude to the pixel electrode for a pre-selected period of time. The pre-selected period of time may be, for example, a refresh cycle or portion of a refresh cycle. The selected voltage sources may be connected to a pixel electrode simultaneously, sequentially, or some combination thereof.

One refresh cycle of a display, i.e., a "frame", can be divided into multiple sub-cycles, i.e., "sub-frames". In some embodiments, the voltage source or sources connected to a pixel electrode can be changed from one sub-frame to the next, to provide a total impulse that corresponds to a total impulse indicated by the display signal. In some embodiments, one or more voltage sources charge a pixel capacitor during one or more sub-frames until the capacitor attains a desired addressing voltage, which can be less than the voltage of voltage sources.

Various embodiments of the invention utilize display image numerical data signals that are known to one having ordinary skill in the electronic display arts. For example, a display can include a controller, e.g., a video card, that processes image bitmap data and forwards image data to logic circuitry. The logic circuitry, as known in the art, can receive numerical voltage impulse data that characterizes a voltage signal, horizontal timing data, and vertical timing data. The logic circuitry can then provide numerical signals to row and column drivers.

The invention features, in part, addressing architectures in which driver circuitry need not include DACs. According to principles of the invention, a digital data signal, which includes data that identifies addressing impulses, can be used to select voltage sources having preexisting voltage amplitudes to provide the addressing impulses. Thus, a display need not utilize a digital-to-analog conversion process to produce a voltage impulse from a display signal.

Impulse duration information may be explicitly or implicitly included in a display signal. In the latter case, for example, the display signal may include a series of numbers that identify voltage magnitudes of addressing impulses while the duration of an impulse is implicitly indicated by the period of a display refresh cycle and/or sub-cycles.

Each digit of a number associated with a voltage impulse, for example, each bit of a binary number, can be used to select a related voltage source having a unique voltage amplitude for application during an associated sub-cycle of an addressing cycle. Thus, for example, a column driver can select different preexisting voltage amplitudes for application to each pixel electrode during each sub-cycle to obtain a total voltage impulse for each pixel electrode as indicated by a received display signal.

In other embodiments, an addressing voltage impulse is created, in part, by charging a pixel capacitor to a voltage amplitude that is less than the voltage amplitude of a voltage source. For example, voltage impulses can have a fixed duration and a variable voltage amplitude that is controlled by limiting the length of time a voltage source is connected to a pixel capacitor. In one embodiment, the resistance-capacitance (RC) time delay of a charging circuit is utilized to control the charging of the pixel capacitor. Thus, without use of digital-to-analog conversion of addressing impulse data, the data can be used by a source driver to control the impulse applied to a pixel electrode.

The invention can provide, for example, lower cost of implementation for column driver circuits, faster design time and lower complexity, to decrease time-to-market and development risk. Smaller die size of integrated circuits (ICs) can decrease cost and increase yield. Smaller dice on a polycrystalline silicon panel can permit, for example, fabrication of more panels on a glass substrate or increase the fraction of panel footprint available for pixels.

In one embodiment of the invention, the number of transistors required to implement a power rail switching scheme is less than the number of transistors required to implement a conventional R-DAC system. The number of transistors can be further reduced when the number of voltage levels provided by the driver circuit is relatively low (for example, approximately 16 or fewer.) When the transistors are operated only in saturation mode, and no sensitive analog nodes exist in the circuit, a driver design can produce more accurate output levels, and can be less complex and easier to design, analyze, fabricate, and test.

Any of the above features can be used in an electro-optic display with a variety of display media, for example, an electrophoretic display medium, a rotating ball medium or an electrochromic medium. For example, such display media can include nonemissive display elements such as particles, particle-containing capsules (e.g., microencapsulated electrophoretic display elements), bichromal spheres or cylinders, or rotating round balls, dispersed in a binder. As a further example, an electrochromic medium can be used as a nonemissive display medium.

In embodiments that utilize a bistable medium, information regarding a present optical state of a pixel can be stored, for example, in a lookup table. If the pixel display medium optical state must be updated to accommodate a change in the displayed image, an addressing voltage impulse can then be applied to yield a change from a present optical state to the new optical state.

Thus, a voltage impulse applied to a display medium to obtain a new optical state is determined via a comparison of the desired optical state to the previous optical state. The required addressing voltage impulse is determined by calculating the voltage impulse required to drive the display medium from its present state to the desired optical state.

BRIEF DESCRIPTION OF THE DRAWINGS

The invention is pointed out with particularity in the appended claims. The advantages of the invention described above, together with further advantages, may be better understood by referring to the following description taken in conjunction with the accompanying drawings. In the drawings, like reference characters generally refer to the same parts throughout the different views. Also, the drawings are not necessarily to scale, emphasis instead generally being placed upon illustrating the principles of the invention.

FIG. 1b is a flowchart of an embodiment of a method for addressing a display, as can be implemented, for example, by the structure shown in FIG. 1a.

FIG. 2b is a more detailed schematic diagram of a portion of the structure illustrated in FIG. 2a.

FIG. 3a is a block diagram of a sequential voltage frame addressing structure, which is an alternative detailed embodiment of the addressing structure shown in FIG. 1a.

FIGS. 3c to 3e, are bar graphs that illustrate some addressing voltage impulses that can be applied to a pixel electrode by the addressing structure shown in FIG. 3a.

FIG. 4b is a flowchart of an embodiment of a method for addressing a display, as can be implemented, for example, by the addressing structure shown in FIG. 4a.

DETAILED DESCRIPTION

Figure 1A:
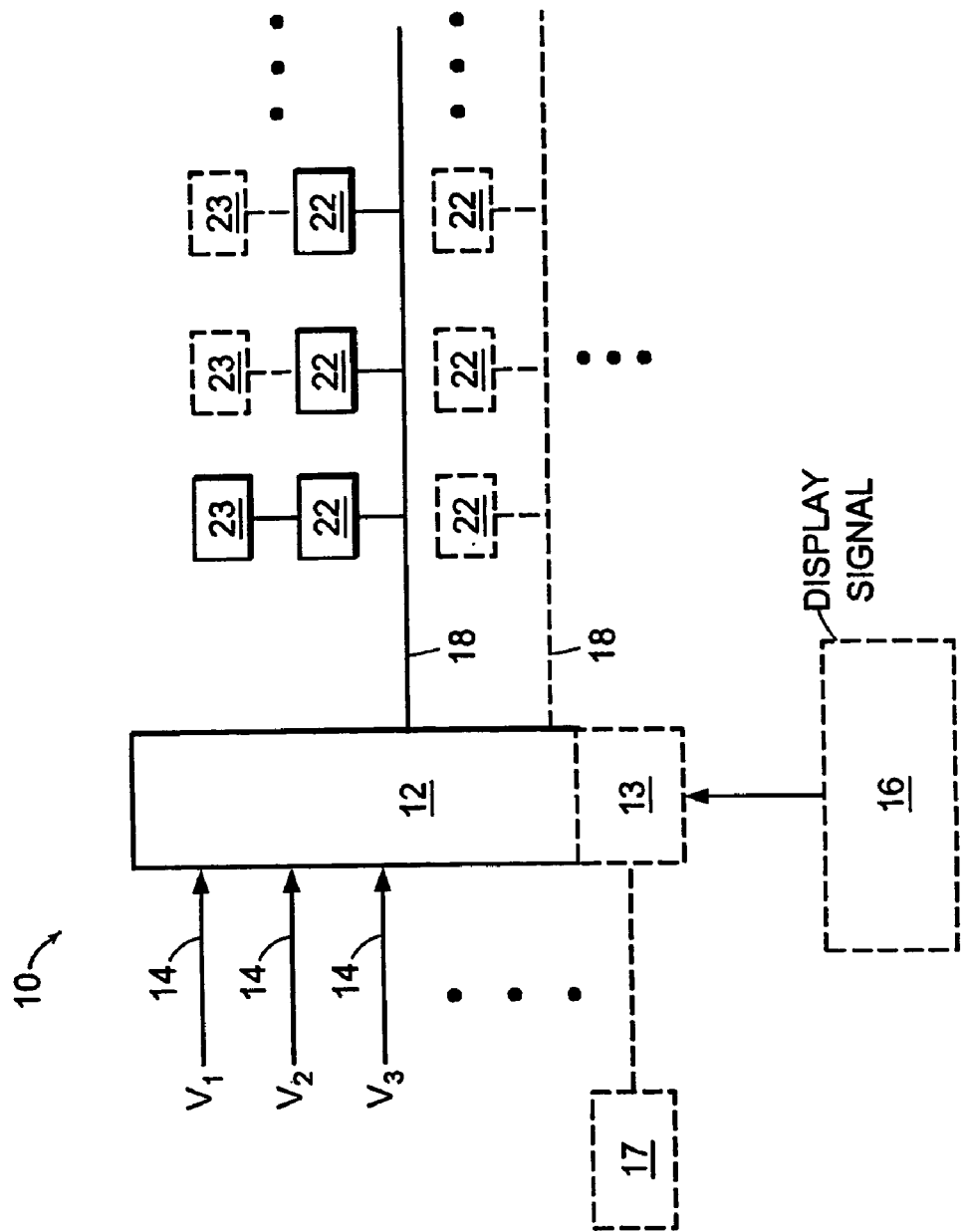
FIG. 1a is a schematic diagram of an embodiment of an addressing structure of a display.

FIG. 1a is a schematic diagram of an embodiment of an addressing structure 10 of a display, according to principles of the invention. The display includes one or pairs of switch circuits 22 and pixel electrodes 23, which may be arranged in one or more columns and one or more rows. The addressing structure 10 includes a switch unit 12 that responds to a display signal, and one or more voltage sources 14 that are each associated with a voltage level $V_1$, $V_2$, $V_3$—at least two of which are preferably different—and are in electrical communication with the switch unit 12. If the display includes a column of switch circuits 22, the structure 10 may include a column electrode 18 electrically connecting the switch unit 12 to each of the switch circuits 22 in the column.

The addressing structure 10 may also include a display signal generator 16 that provides the display signal. The structure may include a column voltage selector 13 to control the switch unit 12 in response to the display signal, received, for example, from the display signal generator 16.

The addressing structure 10 may include a data storage unit 17 that stores optical state information for portions of a display medium defined by the pixel electrodes 23. The voltage selector 13 may then appropriately operate the switch unit 12 in response to a desired change in the optical state of one or more portions of display medium. The voltage selector 13, for example, or another component, may compare a desired new optical state to a present optical state and determining an impulse that will change the optical state from the present state to desired new state.

Figure 1B:
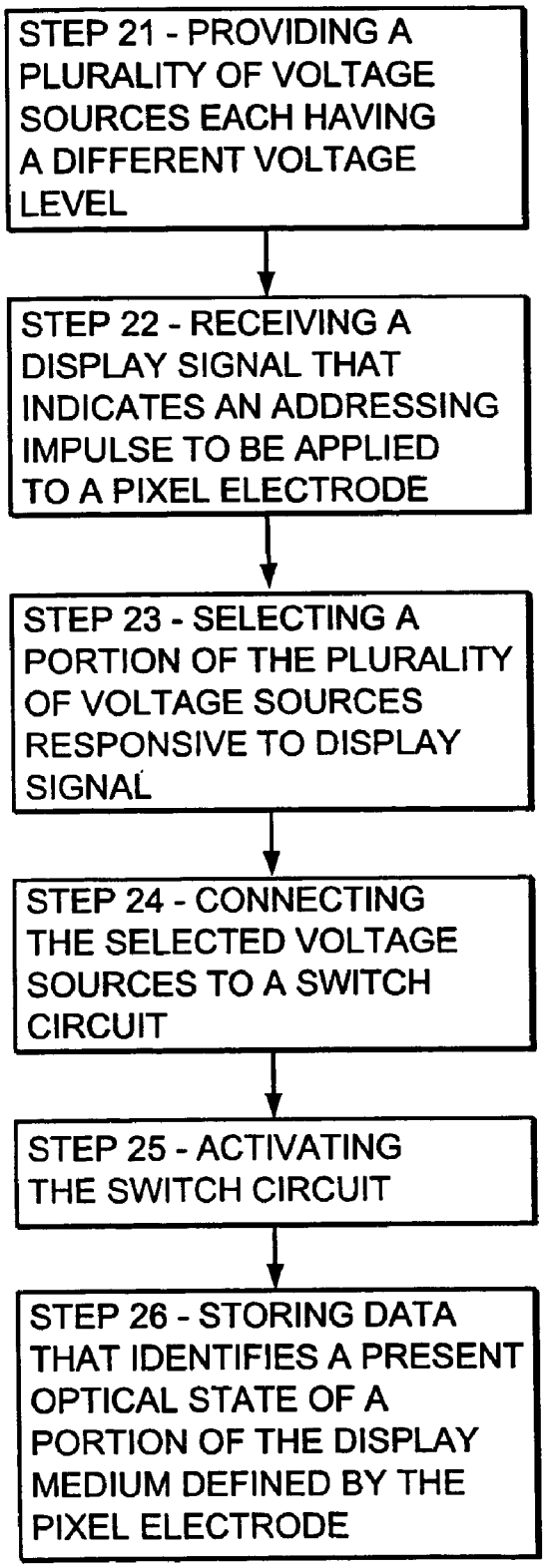

FIG. 1*b* is a flowchart of an embodiment of a method 20 for addressing a display, as can be implemented, for example, by the addressing structure 10 shown in FIG. 1*a*. The method 20 includes providing a plurality of voltage sources, e.g., sources 14, that preferably have different voltage levels from each other (Step 21), receiving a display signal that indicates an addressing impulse to be applied to a pixel electrode (Step 22), e.g., the pixel electrode 23, and selecting a portion of the plurality of voltage sources responsive to the display signal (Step 23). The step of selecting (Step 23) may include comparing a new optical state to the present optical state of the pixel unit.

The method 20 further includes connecting the selected voltage sources to a switch circuit that is connected to the pixel electrode (Step 24). A selection signal may be applied to the switch circuit to activate it (Step 25) in cooperation with the step of connecting the selected voltage sources (Step 24). Thus, the selected voltage sources may be electrically connected to the pixel electrode.

The method 20 may further include storing data that identifies the present optical state of the pixel unit (Step 26). The stored data may then support a comparison of the new optical state with the present optical state.

Figure 2A:
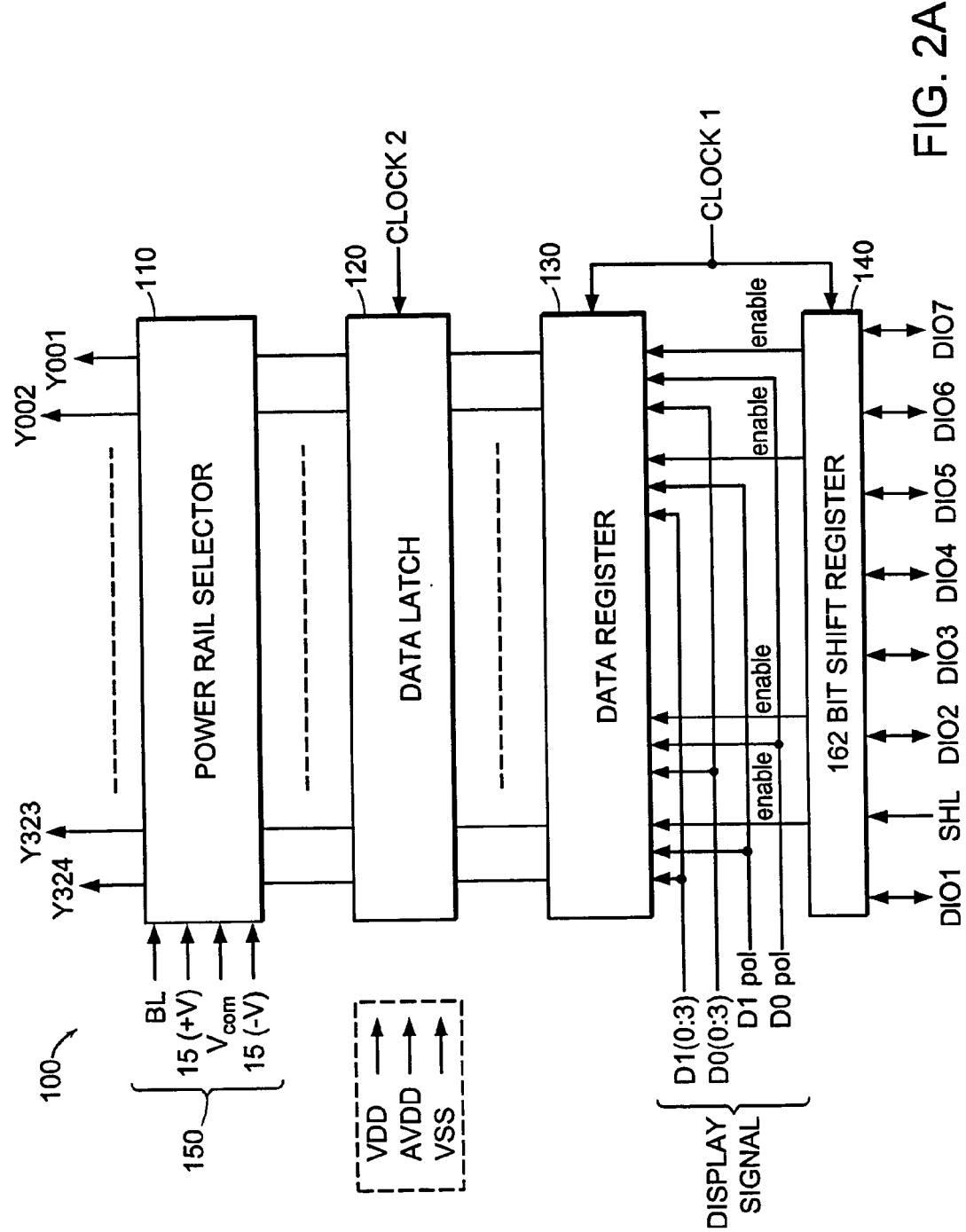
FIG. 2a is a block diagram of an embodiment of a addressing structure.
Figure 2B:
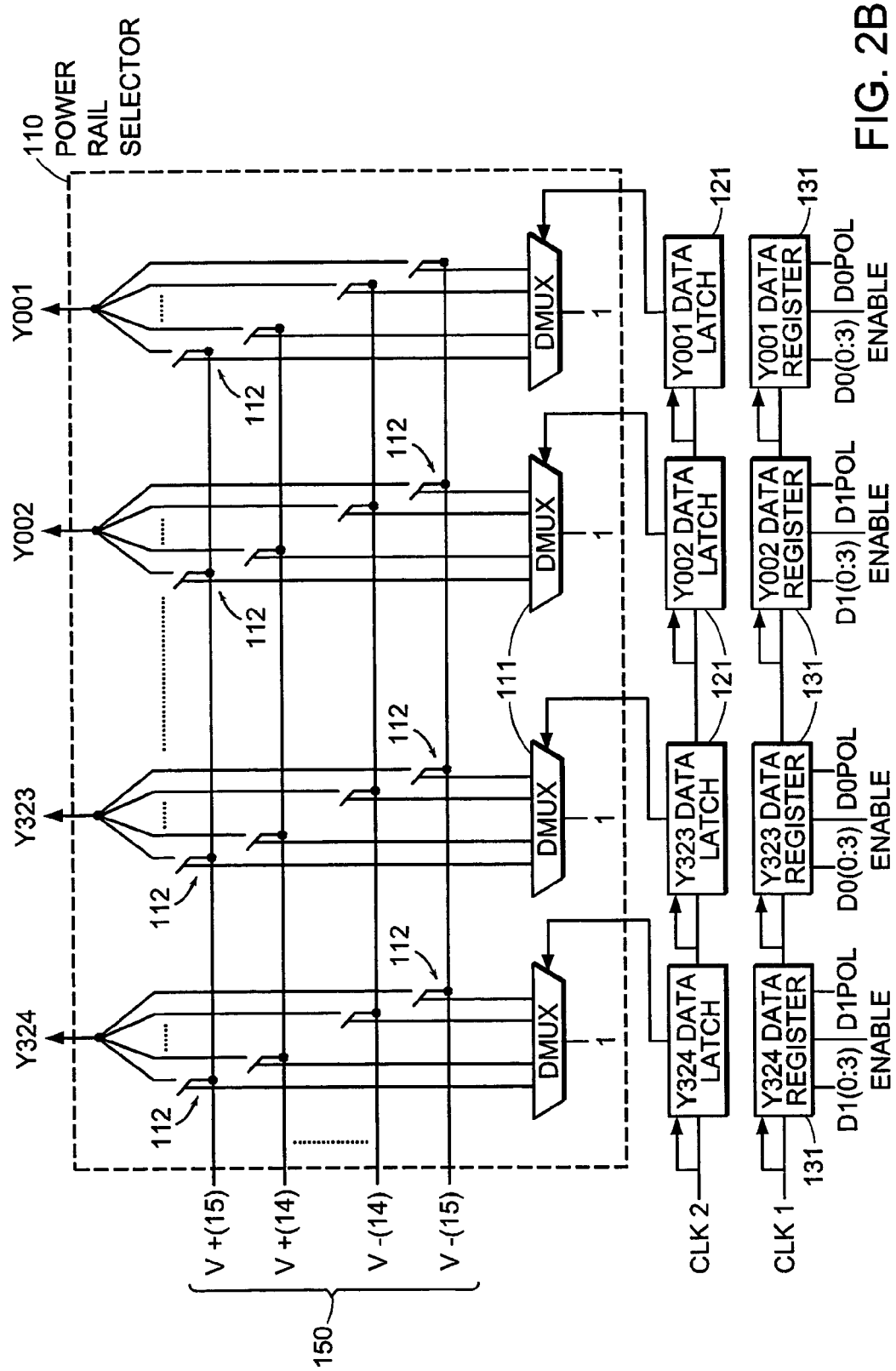

Referring next to FIGS. 2*a* and 2*b*, voltage sources, such as the voltage sources 10 of the embodiment described above, may be provided via a set of voltage rails, each supplying a predetermined voltage. Thus, according to general principles illustrated by the method 20, various combinations of the rails can be selected to obtain a voltage of a desired amplitude and sign to apply to a pixel unit.

FIG 2*a* is a block diagram of an embodiment of a driver circuit 100, i.e., an addressing structure. The driver circuit 100 illustrates a particular detailed implementation of the addressing structure 10 of FIG 1*a*. The circuit 100 is configured to connect voltages to 324 column electrodes each electrode connected to a column of switch circuits, such as pixel transistors. The driver circuit 100 includes a voltage rail switch unit 110 (related to the switch unit 12 shown in FIG 1*a*), voltage rail sources 150 in communication with the voltage rail switch unit 110, and a data latch 120, a data register 130 and a 162-bit shift register 140 (the last three being related to the voltage selector 12 shown in FIG. 1*a*.

The driver circuit 100 provides 324 pixel addressing voltage outputs, one for each of the 324 column electrodes. Each column electrode permits addressing of pixel electrodes attached to the column. The voltage rail sources 150 include 31 rails each providing different voltage levels. The driver circuit 100 is thus capable of applying 31 different output voltage levels to each of the 324 outputs, by selecting a voltage rail 150 having a desired voltage. The voltage levels are a reference voltage Vcom, 15 voltages greater than Vcom (positive voltages), and 15 voltages less than Vcom (negative voltages.) Each voltage level is provided by a corresponding power rail 150 that is in communication with the voltage rail switch unit 110.

The driver circuit 100 provides 324 pixel addressing voltage outputs, one for each of the 324 column electrodes. Each column electrode permits addressing of pixel electrodes attached to the column. The voltage rail sources 150 include 31 rails each providing different voltage levels. The driver circuit 100 is thus capable of applying 31 different output voltage levels (plus a $32^{nd}$ level of zero volts) to each of the 324 outputs, by selecting a voltage rail 150 having a desired voltage. The voltage levels are a reference voltage Vcom, 15 voltages greater than Vcom (positive voltages), and 15 voltages less than Vcom (negative voltages.) Each voltage level is provided by a corresponding power rail 150 that is in communication with the voltage rail switch unit 110.

A numerical display signal, which includes data indicating a desired addressing impulse, is used by the driver 100 to select one or more of the voltage rails 150. The selected rails have voltages associated with the impulse identified by the display signal. The driver circuit 100 thus provides a voltage impulse to be applied to a pixel electrode without use of conventional conversion of a numerical display signal data into an analog voltage impulse signal.

The driver circuit 100 can select output voltages without reliance on a DAC-based architecture. The driver circuit 100 uses display signal data to select none, one or more than one of the voltage rails 150. The switch unit 110 may include transistors operating as switches to either connect or disconnect each power rail 150 to output lines, depending on the status of the data loaded for that output line. The driver circuit 100 can be implemented, for example, in any suitable semiconductor technology.

Some of the signals shown in FIGS. 2*a* and 2*b* may be provided by a display controller. Signal indicia shown in FIG. 2*a*, which are familiar to one having ordinary skill in the electronic display circuitry arts, are as follows:

VDD—logic power supply, for example, supply a voltage of 3 V;

AVDD—driver power supply, for example, supply a voltage of 15 V; and

VSS—ground.

Signals associated with the shift register 140 are as follows:

SHL—shift direction control input, a parity bit which controls the direction in which the shift register 140 shifts;

DIO1–DIO7—seven start pulse inputs, set high to reset the shift register 140 and begin an image refresh cycle, only one of these seven inputs need be used in any specific configuration, but seven, or more or fewer, may be provided to enable the same circuitry to be used with displays having differing numbers of columns; and Clock 1—a fast clock signal, set to one half of the cycle scan rate. The vertical lines extending upwardly from the shift register 140 in FIG. 2*a* carry enable signals (as also shown in FIG. 2*b*.) There are 162 enable lines, although only four are shown in FIG. 2*a*.

Signals associated with the data register 130:

D0(0:3)—a 4-bit data value specifying an impulse for an "odd" pixel electrode, i.e. a pixel electrode in an odd-numbered column;

D1(0:3)—Similar to D0(0:3), but identifying an impulse for an even pixel electrode;

D0pol—polarity signal for odd pixel electrode; and

D1pol—polarity signal for even pixel electrode.

Signal associated with the data latch 120:

Clock 2—a slow clock signal that identifies a row scan rate.

Signals associated with the voltage rail switch unit 110:

Y001–Y324—column voltage outputs, fed to the 324 column electrodes 18 of the driver circuit 100; and BL—a blanking signal used to set all voltage outputs of the driver circuit 100, i.e., Y001–Y324, to Vcom. Setting all voltage outputs to Vcom need not blank a bistable display; rather, it may stop the driver circuit 100 writing to the display, thus allowing a present image to remain.

FIG. 2b is a more detailed schematic diagram of a portion of the driver circuit 100 illustrated in FIG. 2a. FIG. 2b, in particular, shows more detail of the circuitry of the voltage rail switch unit 110. The voltage rail switch unit 110 includes multiplexing units 111 (DMUX), for each pixel unit column of the display, and individual switches 112. Each multiplexing unit 111 operates switches 112 to connect a portion of the voltage rails 150 to obtain a desired voltage for application to an associated column electrode, e.g., the column electrode 18.

The switches 112 may include one or more transistors. Each of the voltage sources 150 can be connected to each of the outputs Y001–Y324 via one of the switches 112. A switch 112 may be, for example, a high voltage field-effect transistor (FET) capable of handling +/−15 V. The outputs of the multiplexing units 111 can be connected to the gates of these transistors.

The data register 130 includes 324 individual column data registers 131, one for each corresponding column electrode. The data latch 120 includes 324 individual column data latches 121, again, one for each corresponding column.

The circuit 100 operates in the following manner. First, a start pulse is provided by setting, for example, DIO1 high to reset the shift register 140 to a starting location. The shift register may now operate in a conventional manner. For example, at each pulse of Clock 1, one of the 162 outputs of the shift register shifts high, the other outputs are held low, and the high output is then shifted one place at each subsequent pulse of Clock 1.

A display controller may provide the two four-bit impulse data values D0(0:3) and D1(0:3) and the two polarity signals D0pol and D1pol to inputs of the data registers 131 (see FIG. 1B.) At the rising edge of each clock pulse Clock 1, the two data registers 131 that are connected to the selected (high) enable output of shift register 140 write five-bit values, provided by combining the appropriate one-bit polarity signal D0pol or D1pol with the appropriate four-bit impulse values D0(0:3) or D1(0:3). The five-bit values are provided to the data Latches 121, where the five-bit values may be latched in a conventional fashion. After 162 cycles of Clock 1, an array of 324 five-bit values will have been written into the data latches 121, and this array of five-bit values represents the impulses to be applied to one row of pixel electrodes of the display.

When the data latches 121 receive the rising edge of a slow clock pulse, Clock 2, the latches 121 write the latched values into the multiplexing units 111. Each of the multiplexing units 111 has a single output (designated "1," in FIG. 2B, and held permanently high during typical operation of the circuit 100) and 32 outputs, one of which is held high and all the others low. The selected high output depends on the value written into the multiplexing unit 111 by the data latch 121.

Each multiplexing unit 111 controls to which of the 31 possible input voltages sources 150, V+(1–15), Vcom and V−(1–15), its associated output line, i.e., Y001–Y324, is connected. The different between the 32 possible outputs of each multiplexing unit 111 and the 31 possible input voltages is accommodated by permitting two different outputs of a multiplexing unit to both select the Vcom voltage rail 150.

The whole of the foregoing procedure is repeated for each row of the display, the selected row being chosen by a row controller not shown in these drawings. The driver circuit 100 may be employed in a display having a common front electrode configuration, as suitable for active matrix electro-optic displays. In such a configuration, the viewing surface of the display (i.e., the surface through which an observer views the display) includes a transparent substrate bearing a single transparent common electrode which extends across all the pixels of the display. The electro-optic medium is disposed between this common electrode and a matrix of pixel electrodes disposed on an active matrix backplane. The voltage applied to the common front electrode is designated "Vcom". For example, Vcom may be set to ground. Thus, to apply a non-zero voltage across a pixel capacitor, a voltage other than Vcom is placed on the pixel electrode.

Figure 3A:
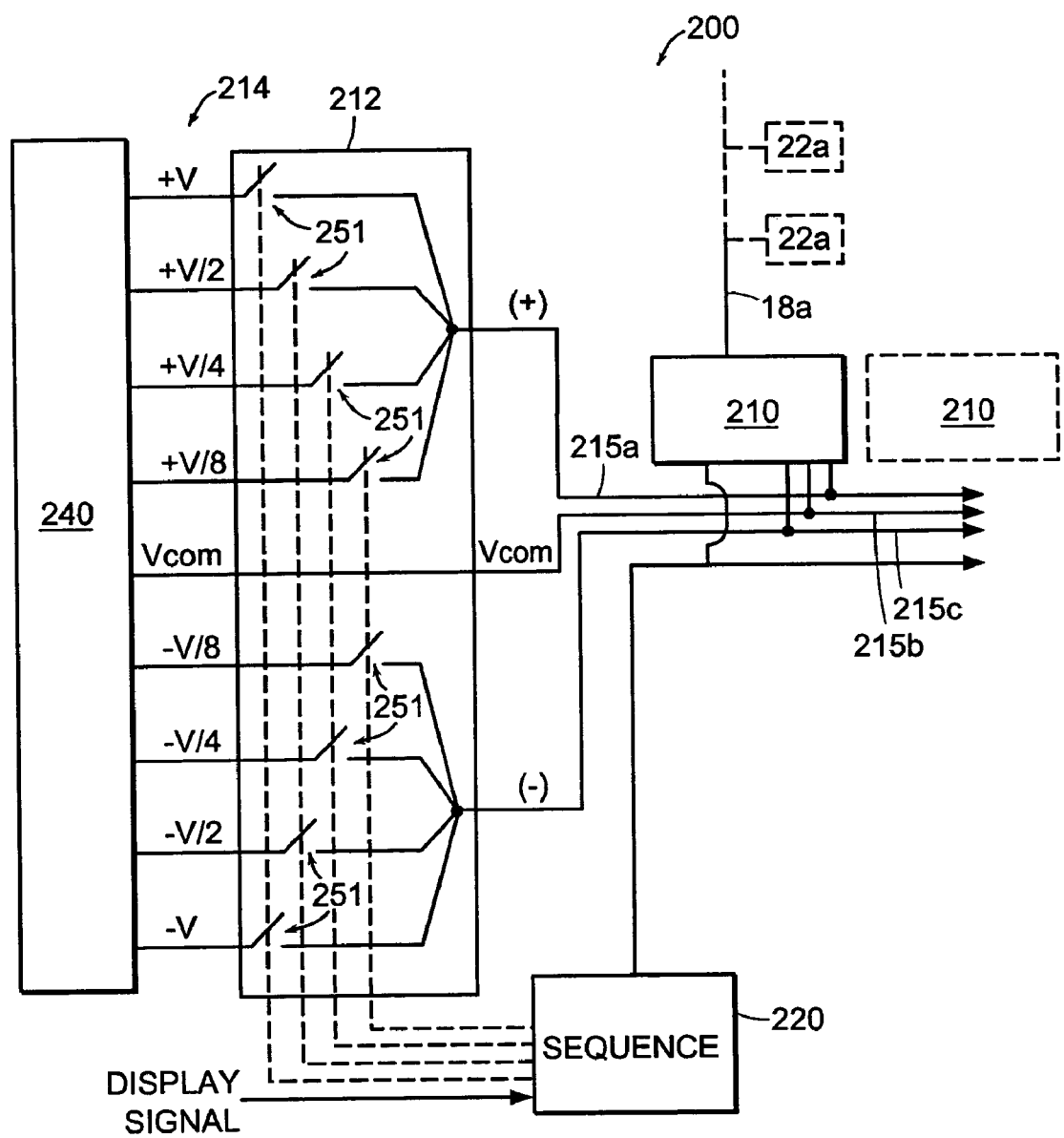

FIG. 3a is a block diagram of a sequential voltage frame addressing structure 200, which is an alternative detailed embodiment of the addressing structure 10 of FIG. 1a. The structure 200 includes a voltage supply 240 providing voltage sources 214, column electrode 18a, pixel transistors 22a connected to the column electrode 18a, a source driver circuit 210 for each column of pixel transistors 22a, a sequencer 220, a switch unit 212, and three voltage rails 215a, 215b, 215c. The functionality of the switching unit 12 of the structure 10 shown in FIG. 1a is associated with portions of multiple components of the addressing structure 200, i.e., with portions of the source driver circuit 210, the sequencer 220, and the switch unit 212.

The switch unit 212 communicates with nine voltage sources 214 as inputs to receive nine voltage levels having values of +V, +V/2, +V/4, +V/8, Vcom, −V/8, −V/4, −V/2, and −V. The switch unit 212 communicates with the three voltage rails 215a, 215b, 215c as outputs to receive voltage levels provided via the switch unit 212. One rail 215b is provided with a voltage level of Vcom, while the other two rails 215a, 215c, responsive to control of the switch unit 212 by the sequencer 220, sequentially are provided with voltage levels of V/8, V/4, V/2, and V, one rail 215a being positive and the other rail 215c being negative.

Figure 3B:
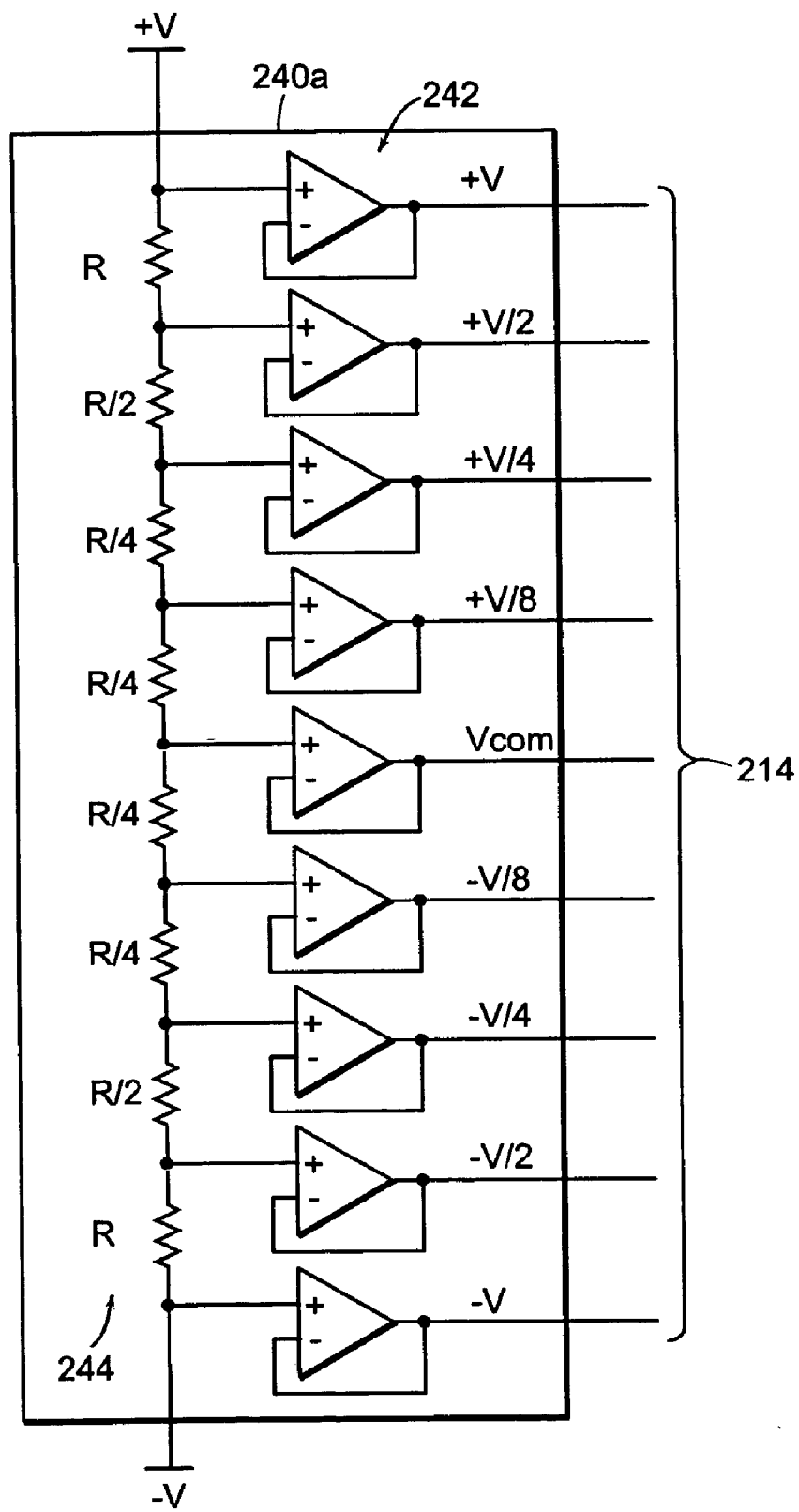
FIG. 3b is a schematic diagram of one embodiment of a voltage supply.

FIG. 3b is a schematic diagram of one embodiment 240a of the voltage supply 240. The supply 240a includes a series of eight resistors 244 and eight buffers 242 that output the nine voltage Levels described above. The eight resistors act as voltage dividers, to supply each of the nine buffers 242 with an appropriate voltage.

The eight resistors 244 provide a potentiometer that defines nine voltages. The nine buffers 242 assert on the nine voltage sources 214 voltages that correspond to those defined by the potentiometer, while allowing circuitry attached to the nine voltage sources 214 to draw from these nine voltage sources 214 currents substantially in excess of the currents which could be drawn directly from the potentiometer outputs without significant distortion of the voltages on these outputs.

The addressing structure 200 can provide addressing impulses by providing different voltage levels during each sub-cycle of a refresh cycle. The embodiment can permit finer impulse modulation than possible for architectures that utilize pure time modulation, yet does not require the use of a DAC-based architecture in a column driver circuit.

Each source driver 210 is in communication with all three rails 215a, 215b, 215c. The source driver 210 connects one of three rails 215a, 215b, 215c to a column electrode 18a as required to provide an addressing voltage to a pixel transistor 22a connected to the column electrode 18a.

The addressing structure 200 utilizes an address cycle (one frame) of 160 ms, which is divided into 4 sub-frames of 40 ms each. The source drivers 210 select one of the three voltage rails 215a, 215b, 215c in response to a magnitude bit and a sign bit loaded from the sequencer 220 for each output line. The addressing structure 200 sequences the voltage supplied to the voltage rails 215a, 215b, 215c, via switching instructions from the sequencer 220, as each sub-frame of addressing occurs. One power rail 215b provides a voltage of Vcom, and the positive rail 215a and the negative rail 215c are switched from sub-frame to sub-frame, e.g., switched from V to V/2 to V/4 to V/8.

The sequencer 220 causes the switch unit 212 to connect voltage sources 214 to the rails 215a, 215b, 215c in an appropriate sequence with each sub-frame of a frame. The sequencer 220 also receives display signal input data (4 bits and a sign bit per pixel update) regarding a desired addressing voltage impulse. A source driver circuit 210 may then complete the connection of the appropriate voltage sources 214 to a pixel transistor 22a by connecting one of the three voltage rails 215a, 215b, 215c to the associated column electrode 18a. Two bits are clocked into the driver 210 from the sequencer 220 in sequence with each sub-frame; a sign bit and a magnitude bit. The two bits identify the rail 215a, 215b, 215c to be connected to the pixel unit.

If the magnitude bit is set, either the positive or negative rail 215a, 215c is selected, depending on the value of the sign bit. If the magnitude bit is clear, the common plane supply rail 215b is selected. The drivers 210 function as one-bit voltage rail switch unit circuits.

Desired voltage impulses can be constructed by appropriately connecting rails 215a, 215b, 215c to a column electrode 18a during a cycle of the display. Thus, an effectively fine degree of impulse control is possible.

In more detail, the addressing structure 200 receives a display signal that identifies an addressing impulse, in part, via the four-bit binary number described above. The 4 bits of addressing voltage impulse data are mapped to the four sub-frames, one bit per sub-frame. For example, the first bit of data (i.e. the 8's bit for a 4-bit binary number) is mapped to the first sub-frame, the second bit of data (the 4's bit) is mapped to the second sub-frame, and so on.

The mapping provides that a bit of value zero will cause a voltage amplitude of Vcom to be applied during the corresponding sub-frame. A bit of value one will cause a voltage of V, V/2, V4 or V/8 to be applied, depending on the position of the bit. As described above, a sign bit determines whether the positive or negative rail 215a, 215c is selected.

The addressing structure 200 updates the image presented by the display once per cycle, herein referred to as a "frame". A frame can be divided into more than one "sub-frame", where all rows of pixels of the display may be partially addressed once per sub-frame. As described above, the present illustrative embodiment includes four sub-frames per frame. Other embodiments of the invention utilize, for example, one, two, three, five, six, seven, eight or more sub-frames.

The voltage amplitude of an addressing impulse can thus change from sub-frame to sub-frame. Further, a sub-frame may be used to refresh the charge of a pixel capacitor, if, for example, an applied voltage amplitude is to remain the same as during a previous frame. Thus, refreshing of capacitors during each sub-frame scan may be used to compensate for capacitor charge loss.

Numerous voltage impulses can be provided by the addressing structure 200 by making use of different combinations of sub-frame voltages. During the first of the four sub-frames, a voltage amplitude of +V, Vcom or −V can be applied. During the second sub-frame, a voltage amplitude of +V/2, Vcom or −V/2 can be applied. During the third sub-frame, a voltage amplitude of +V/4, Vcom or −V/4 can be applied. During the fourth sub-frame, a voltage amplitude of +V/8, Vcom or −V/8 can be applied.

Figure 3C:
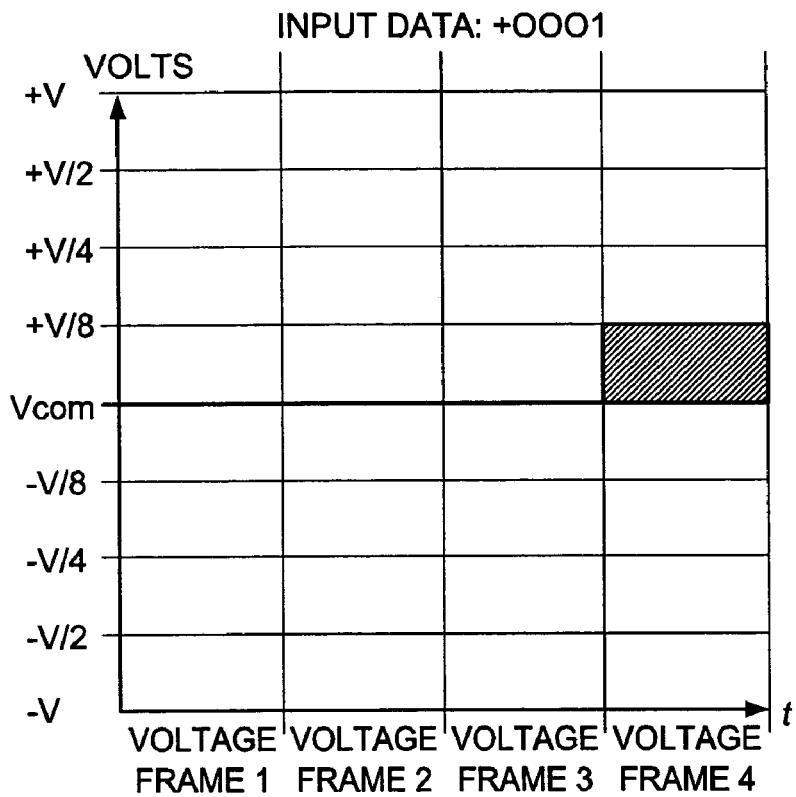
Figure 3D:
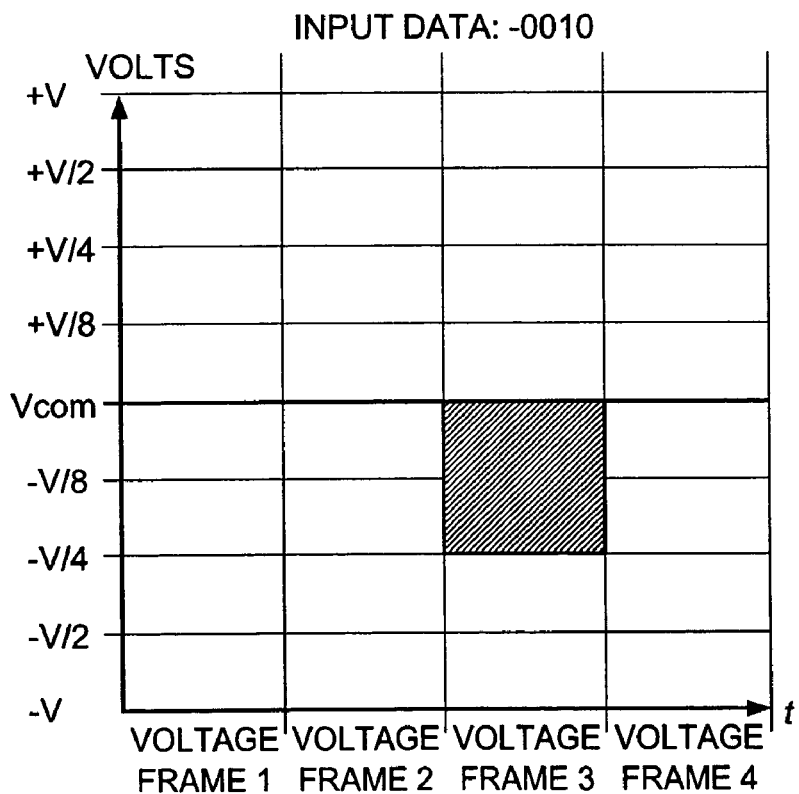
Figure 3E:
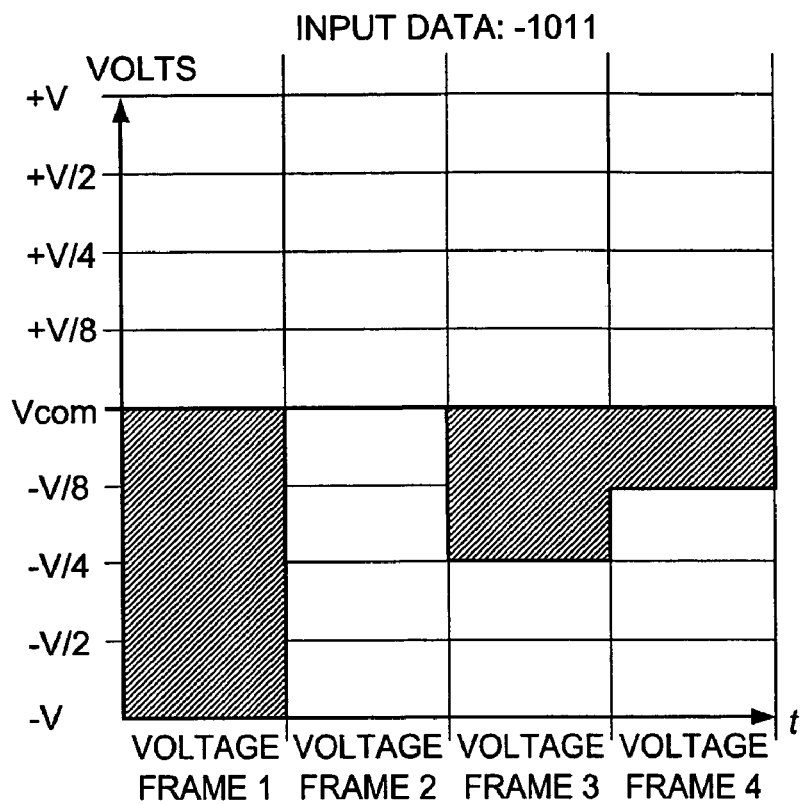

FIGS. 3c to 3e, are bar graphs that illustrate some addressing voltage impulses that can be applied to a pixel unit by the addressing structure 200 of FIG. 3a. FIGS. 3c, 3d and 3e illustrate the application of a voltage impulse associated respectively with 4-bit voltage impulse data of +0001, −0010 and −1011. Each bit identifies whether or not the voltage amplitude of the associated sub-frame is to be applied during that sub-frame. For example, the impulse data of −0010 causes a voltage amplitude of −V/4 to be applied during the third sub-frame of a frame.

More generally, the first sub-frame may be used to provide a +/−V amplitude portion of an impulse, if required. The second sub-frame may provide +/−V/2, the third may provide +/−V/4, and so on such that, in an $n^{th}$ sub-frame (with the first sub-frame being identified as the zeroth sub-frame), two of the voltage rails 215a 215c are powered by $+/-V/(2^n)$. Integrated over all sub-frames, $2^n$ distinct voltage impulses can be provided to pixel electrodes of the display.

The addressing structures 10, 100, 200 may permit delivery of deterministic and discrete impulses in a repeatable manner. The impulse values coded for a particular optical transition may be pre-determined according to a model or by empirical analyses. Thus, addressing structures according to principles of the invention are well suited to electro-optic display media that have a non-linear response to voltage changes and a response that varies during a voltage impulse.

The amount of time required for a full display image update may be greater than obtained via a conventional time or voltage modulation scheme. For the addressing structure 200, the impulse integral of a maximal impulse is 2Vt, where t is the duration of application of the voltage. In other words, 2Vt is the integral of the voltage curve if a maximal impulse is commanded with the input data (i.e. +/−1111 in the above example.) If 2Vt is the impulse needed for the full scale optical transition of the display medium, the same response could be achieved in 2 frames rather than n frames (i.e., 4 frames in the above example) in a system with pure voltage or time modulation. Thus, a tradeoff may be required between more sub-frames for finer impulse control and longer response speed due to the need to sequence voltages across sub-frames.

The possible tradeoff can be mitigated in several ways. For example, a display may be operated in a hybrid mode, in which each update may be either a black/white update or a gray scale update. The nature of the update may be communicated from a controller to a sequencer via a dedicated signal line or a special command sequence. If a gray scale update is selected, a sequencer may process the update as described above. A gray scale update may be selected to either display a gray scale image or to change a gray scale image to a black and white image.

If a black and white update is selected, as required, for example, to switch between two pages of text, a sequencer may conduct the update as two sub-frames both of which are done with +/−V switches activated. The sequencer may then determine whether each pixel electrode should receive a positive full voltage for two frames, negative full voltage for two frames, or no impulse, and would send the appropriate data to the drivers during the two frames. In this way, a black and white update may occur at full speed while a gray scale update would require more time.

Other embodiments of an addressing architecture vary the particular features of the illustrative embodiment described above. For example, the order in which voltage amplitudes are applied can be varied, i.e., the order need not correspond to the bit order. Also, for example, the voltage amplitudes associated with more than one bit may be combined and applied during the same sub-frame.

Referring to FIGS. 4a, 4b, and 5a to 5e, some embodiments of a method and architecture for addressing a display feature a time delay in the charging of a capacitive element to address a pixel electrode with a voltage of a desired amplitude. The voltage amplitude may be less than that of a voltage source applied to the capacitive element.

Figure 4A:
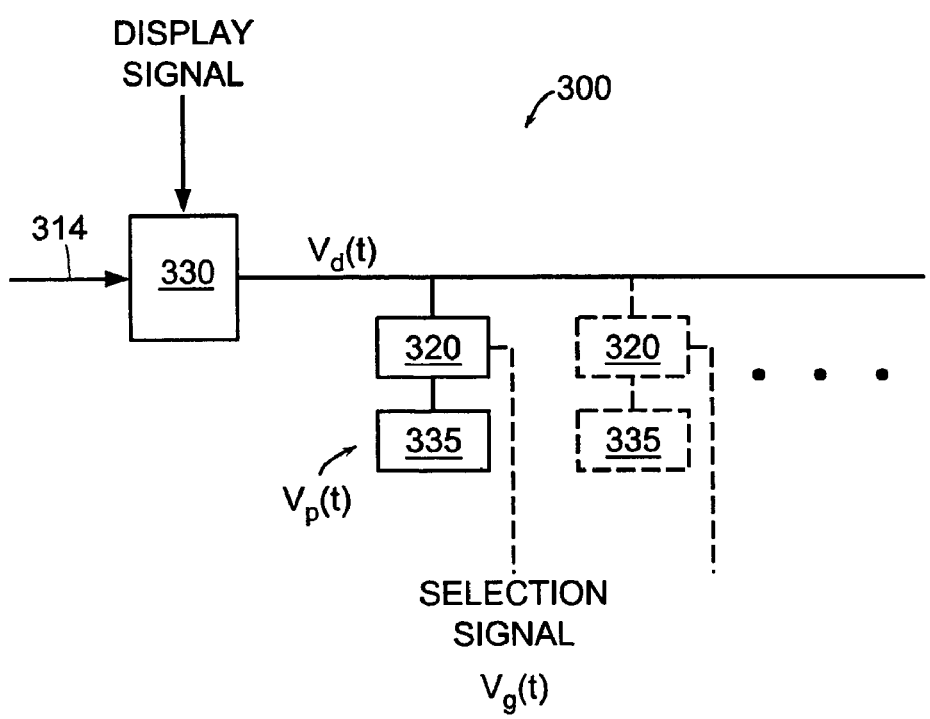
FIG. 4a is a schematic diagram of an embodiment of an addressing structure for a display.

FIG 4a is a schematic diagram of an embodiment of an addressing structure 300 for a display that includes one or more pixels. The structure 300 includes a resistive switch 320 and a capacitive element 335 associated with each pixel. The capacitive element 335 may be, for example, a capacitor formed in part from a pixel electrode. The resistive switch 320 may be, for example, a transistor. The addressing structure 300 also includes a voltage source 314, an addressing voltage controller 330 in communication with the voltage source 314, and the resistive switch 320.

The resistive circuit 320 may be, for example, a FET. When activated by a selection signal, the FET provides a resistive link between the voltage output from the addressing voltage controller 330 and the capacitive element 335.

The addressing voltage controller 330 provides a voltage Vd(t) to the resistive circuit 320 in response to an addressing impulse identified by a display signal. The voltage Vd(t) may be a column drive voltage directed to a column of pixels. A selection voltage Vg(t) may be applied to the resistive circuit 320 if it is, for example, a FET, to switch the resistive circuit 320 to an active, i.e., on, state; the voltage Vd(t) is then applied to the capacitive element 335 to cause it to gradually charge.

The capacitive element 335, in turn, applies a voltage Vp(t) to the pixel unit. The capacitive element 335 and resistive circuit 320 cooperate to provide a RC delay time constant. The addressing structure 300 thus permits use of a single voltage source 314 to provide addressing impulses by permitting the gradual charging of the capacitive element 335 until it provides a desired addressing voltage for the pixel.

The addressing voltage controller 330 can include a digital pulse width modulation (PWM) driver, e.g., similar to drivers used in some gray-scale super-twisted nematic (STN) LCDs. Thus, an addressing voltage impulse can be controlled by controlling an amplitude of the impulse, even though a fixed voltage source may be employed. For example, a variable voltage impulse having an essentially constant pulse length can be produced while using a fixed amplitude voltage source 314 to produce a variable pulse voltage amplitude. The charging of the capacitive element 335 can be accomplished during a length of time that is brief in comparison to the duration of an addressing impulse. Thus, the capacitive element 335 may continue to apply a voltage impulse after an addressing voltage is disconnected from the element 335.

Figure 4B:
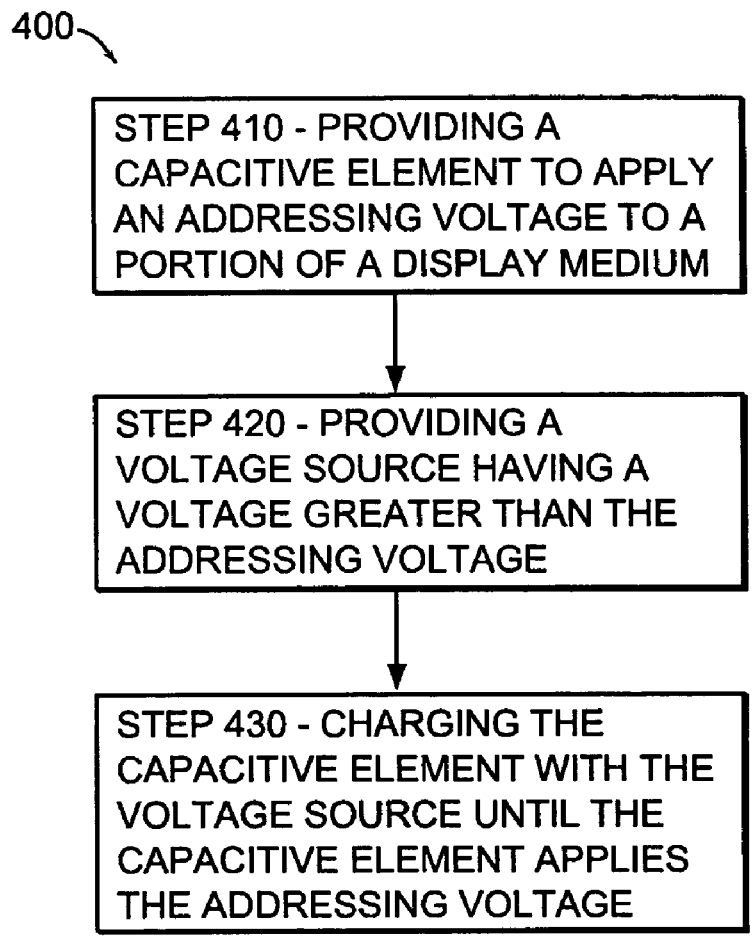

FIG. 4b is a flowchart of an embodiment of a method 400 for addressing a display, as can be implemented, for example, by the addressing structure 300 described above with reference to FIG. 4a. The method 400 includes providing a capacitive element, e.g., element 335, to apply an addressing voltage to a portion of a display medium (Step 410), providing a voltage source having a voltage greater than the addressing voltage (Step 420), and charging the capacitive element with the voltage source until the capacitive element applies the addressing voltage (Step 430).

Each row of capacitive elements of a display may be addressed once per scan of the entire display. For example, a gate driver for each row of pixel FETs activates the TFTs in that row once per scan. The addressing structure may be configured so that one line time, e.g., the amount of time a gate driver activates a single gate row, is enough to charge the capacitive element to a high percentage of its final value, e.g., 5RC. Thus, the final value effectively is a fully charged pixel capacitive element, i.e., the voltage of the capacitive element is effectively equal to the addressing voltage.

Alternatively, the line time and components of an addressing structure may be selected such that a line time is only, e.g., 2RC, and a capacitive element can be left partially charged at the completion of the line time. One way to implement partial charging of the pixel electrode is through use of a digital PWM source driver. The driver can utilize addressing impulse data to begin application of an addressing voltage at different times within a line time. At the end of the line time, e.g., when a source driver ceases to charge the capacitive element, the capacitive element can thus have a voltage that is controlled by the length of time the source driver allowed the capacitive element to be charged.

The level to which the capacitive element is charged is determined by the duration of the charging pulse delivered by the source driver during the line time. The capacitive element of the charging pulse can be controlled by use of the input data loaded into a PWM source driver.

Figure 5A:
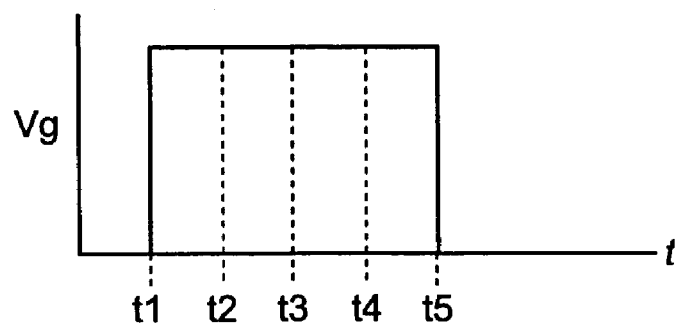
FIGS. 5a to 5e show graphs of voltage versus time, which illustrate the functioning of one embodiment of the invention.
Figure 5B:
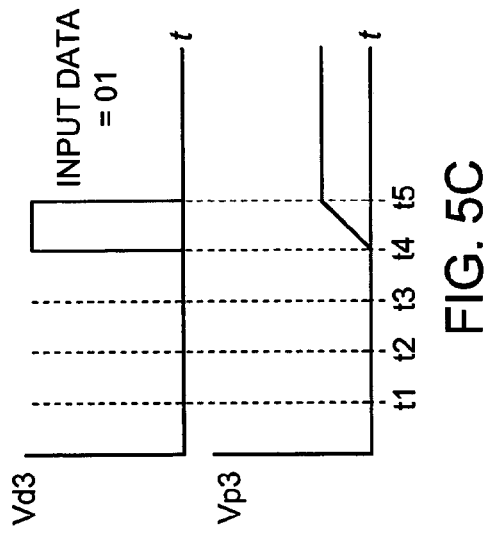
Figure 5C:
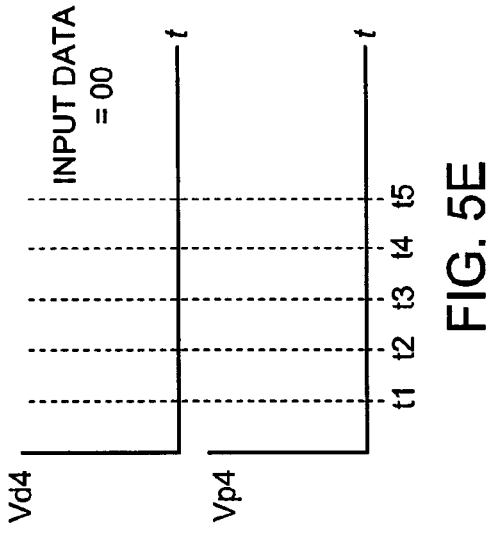
Figure 5D:
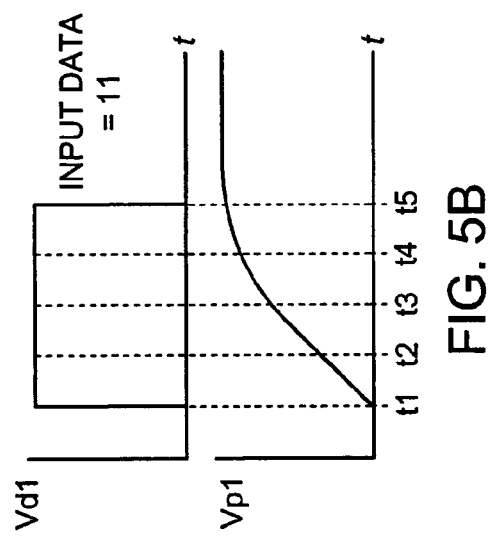

FIGS. 5a to 5c shows graphs of voltage versus time that illustrate the functioning of one embodiment of the invention. The graphs illustrate how a gate driver voltage Vg (FIG. 5a), a source driver addressing voltage Vd1, Vd2, Vd3, and Vd4 (respectively, FIGS. 5b, 5c, 5d and 5e) and a capacitive element voltage Vp1, Vp2, Vp3, and Vp4 (respectively, FIGS. 5b, 5c, 5d and 5e) can appear for an addressing structure having 2-bit PWM column drivers. The 2-bit PWM drivers may utilize 2-bit addressing impulse data to control the length of charging of capacitive elements.

Figure 5E:
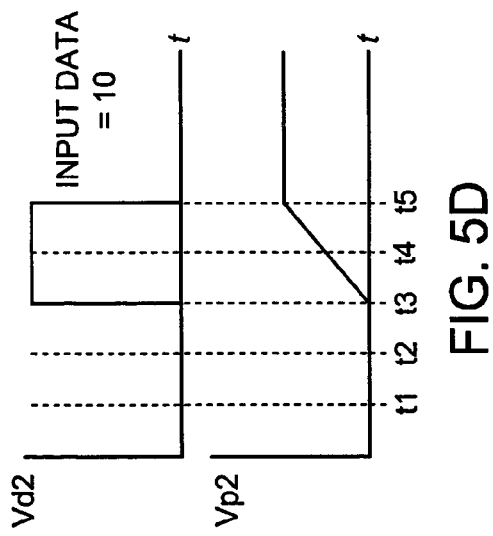

The graphs illustrate the effect of input data of 11 (FIG. 5b), 01 (FIG. 5c), 10 (FIG. 5d) and 00 (FIG. 5e). For example, no addressing voltage is applied for input data of 00, and thus no charging of the capacitive element occurs. For data of 01, charging occurs for one portion of a full line time, and the final capacitive element voltage is thus less than the addressing voltage. The specific mapping between input data and Length of time of charging a capacitive element can be selected as desired for a particular application.

Preferably, the drivers are constructed such that they can output either a common plane voltage, or a positive or negative rail voltage (with respect to the common plane voltage.) Note that no net addressing voltage is applied to a capacitive element when the capacitive element is addressed with the common plane voltage.

The drivers preferably can modulate the portion of one line time that a column electrode is connected to a positive or negative rail. During the portion of one line time that the electrode is not connected to the positive or negative rail, it is preferably connected to the common voltage rail.

If multiple scans are required for a single update of an image presented by a display, voltage waveforms, e.g., may be produced continuously or may be used only to modify a capacitive element voltage during the last frame of an otherwise time-modulated impulse.

If used continuously, a capacitive element, which experiences the same PWM waveform during each line time of a series of scans during an update, will approach a steady state voltage related to the PWM value that is used during the pixel's line time. This addressing technique may be combined with other addressing techniques, for example, with frame-based time modulation.

Illustrative Examples of Display Media that may be Used in Conjunction with Addressing Structures of the Invention—Various types of display media may be included in a display that has addressing architectures according to the present invention. For example, such display media can include nonemissive display elements such as particles, bichromal spheres or cylinders, or rotating round balls.

Another example of a nonemissive medium is an electrochromic medium in the form of a nanochromic film comprising an electrode formed at least in part from a semiconducting metal oxide and a plurality of dye molecules capable of reversible color change attached to the electrode; see, for example O'Regan, B., et al., Nature 1991, 353, 737; and Wood, D., Information Display, 18(3), 24 (March 2002). Nanochromic films of this type are also described, for example, in U.S. Pat. No. 6,301,038 International Application Publication No. WO 01/27690.

Several types of known bistable electro-optic display media may be used in conjunction with features of the invention. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is referred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquidfilled vacuoles within a matrix, the vacuoles being filled with Liquid so that the bodies are free to rotate. The appearance of the display is changed by applying an electric field thereto, thus rotating the bodies to various positions and varying which of the sections of the bodies is seen through a viewing surface.

Features of the invention may be utilized in displays that include unencapsulated electrophoretic media or encapsulated electrophoretic media, for example, encapsulated in a plurality of capsules or in a microcell structure. In a microcell electrophoretic display, the charged particles and the suspending fluid are not encapsulated within microcapsules but instead are retained within a plurality of cavities formed within a carrier medium, typically a polymeric film. See, for example, International Applications Publication No. WO 02/01281, and published U.S. application No. 2002-0075556, both assigned to Sipix Imaging, Inc.

When the display medium includes particle-containing capsules, the capsules may be of any size or shape. In one embodiment of the invention, the capsules are spherical and have diameters in the millimeter or micron range. In a preferred embodiment, the capsule diameters are from about ten to about a few hundred microns. The capsules may be formed by an encapsulation technique and, in one embodiment, include two or more different types of electrophoretically mobile particles.

The walls surrounding discrete microcapsules, in, for example, an encapsulated electrophoretic medium, can be replaced by a continuous phase, thus producing a so-called polymer-dispersed electrophoretic display in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, WO 01/02899, at page 10, lines 6–19.

Some useful materials for constructing encapsulated electrophoretic displays are discussed below.

A. Particles

There is much flexibility in the choice of particles for use in electrophoretic displays, as described above. For purposes of this invention, a particle is any component that is charged or capable of acquiring a charge (i.e., has or is capable of acquiring electrophoretic mobility), and, in some cases, this mobility may be zero or close to zero (i.e., the particles will not move). The particles may be neat pigments, dyed (laked) pigments or pigment/polymer composites, or any other component that is charged or capable of acquiring a charge. Typical considerations for the electrophoretic particle are its optical properties, electrical properties, and surface chemistry. The particles may be organic or inorganic compounds, and they may either absorb light or scatter light. The particles for use in the invention may further include scattering pigments, absorbing pigments and luminescent particles. The particles may be retroreflective, such as corner cubes, or they may be electroluminescent, such as zinc sulfide particles, which emit light when excited by an AC field, or they may be photoluminescent. Finally, the particles may be surface treated so as to improve charging or interaction with a charging agent, or to improve dispersibility.

A preferred particle for use in electrophoretic displays of the invention is titania. The titania particles may be coated with a metal oxide, such as aluminum oxide or silicon oxide, for example. The titania particles may have one, two, or more layers of metal-oxide coating. For example, a titania particle for use in electrophoretic displays of the invention may have a coating of aluminum oxide and a coating of silicon oxide. The coatings may be added to the particle in any order.

The electrophoretic particle is usually a pigment, a polymer, a Laked pigment, or some combination of the above. A neat pigment can be any pigment, and, usually for a light colored particle, pigments such as, for example, rutile (titania), anatase (titania), barium sulfate, kaolin, or zinc oxide are useful. Some typical particles have high refractive indices, high scattering coefficients, and low absorption coefficients. Other particles are absorptive, such as carbon black or colored pigments used in paints and inks. The pigment should also be insoluble in the suspending fluid. Yellow pigments such as diarylide yellow, hansa yellow, and benzidin yellow have also found use in similar displays. Any other reflective material can be employed for a light colored particle, including non-pigment materials, such as metallic particles.

Useful neat pigments include, but are not limited to, $PbCrO_4$, Cyan blue GT 55-3295 (American Cyanamid Company, Wayne, N.J.), Cibacron Black BG (Ciba Company, Inc., Newport, Del.), Cibacron Turquoise Blue G (Ciba), Cibalon Black BGL (Ciba), Orasol Black BRG (Ciba), Orasol Black RBL (Ciba), Acetamine Blac, CBS (E. I. du Pont de Nemours and Company, Inc., Wilmington, Del.), Crocein Scarlet N Ex (du Pont) (27290), Fiber Black VF (DuPont) (30235), Luxol Fast Black L (DuPont) (Solv.

Black 17), Nirosine Base No. 424 (DuPont) (50415 B), Oil Black BG (DuPont) (Solv. Black 16), Rotalin Black RM (DuPont), Sevron Brilliant Red 3 B (DuPont); Basic Black DSC (Dye Specialties, Inc.), Hectolene Black (Dye Specialties, Inc.), Azosol Brilliant Blue B (GAF, Dyestuff and Chemical Division, Wayne, N.J.) (Solv. Blue 9), Azosol Brilliant Green BA (GAF) (Solv. Green 2), Azosol Fast Brilliant Red B (GAF), Azosol Fast Orange RA Conc. (GAF) (Solv. Orange 20), Azosol Fast Yellow GRA Conc. (GAF) (13900 A), Basic Black KMPA (GAF), Benzofix Black CW-CF (GAF) (35435), Cellitazol BNFV Ex Soluble CF (GAF) (Disp. Black 9), Celliton Fast Blue AF Ex Conc (GAF) (Disp. Blue 9), Cyper Black IA (GAF) (Basic Blk. 3), Diamine Black CAP Ex Conc (GAF) (30235), Diamond Black EAN Hi Con. CF (GAF) (15710), Diamond Black PBBA Ex (GAF) (16505); Direct Deep Black EA Ex CF (GAF) (30235), Hansa Yellow G (GAF) (11680); Indanthrene Black BBK Powd. (GAF) (59850), Indocarbon CLGS Conc. CF (GAF) (53295), Katigen Deep Black NND Hi Conc. CF (GAF) (15711), Rapidogen Black 3 G (GAF) (Azoic Blk. 4); Sulphone Cyanine Black BA-CF (GAF) (26370), Zambezi Black VD Ex Conc. (GAF) (30015); Rubanox Red CP-1495 (The Sherwin-Williams Company, Cleveland, Ohio) (15630); Raven 11 (Columbian Carbon Company, Atlanta, Ga.), (carbon black aggregates with a particle size of about 25 μm), Statex B-12 (Columbian Carbon Co.) (a furnace black of 33 μm average particle size), and chrome green.

Particles may also include laked, or dyed, pigments. Laked pigments are particles that have a dye precipitated on them or which are stained. Lakes are metal salts of readily soluble anionic dyes. These are dyes of azo, triphenylmethane or anthraquinone structure containing one or more sulphonic or carboxylic acid groupings. They are usually precipitated by a calcium, barium or aluminum salt onto a substrate. Typical examples are peacock blue lake (CI Pigment Blue 24) and Persian orange (lake of CI Acid Orange 7), Black M Toner (GAF) (a mixture of carbon black and black dye precipitated on a lake).

A dark particle of the dyed type may be constructed from any light absorbing material, such as carbon black, or inorganic black materials. The dark material may also be selectively absorbing. For example, a dark green pigment may be used. Black particles may also be formed by staining latices with metal oxides, such latex copolymers consisting of any of butadiene, styrene, isoprene, methacrylic acid, methyl methacrylate, acrylonitrile, vinyl chloride, acrylic acid, sodium styrene sulfonate, vinyl acetate, chlorostyrene, dimethylaminopropylmethacrylamide, isocyanoethyl methacrylate and N-(isobutoxymethacrylamide), and optionally including conjugated diene compounds such as diacrylate, triacrylate, dimethylacrylate and trimethacrylate. Black particles may also be formed by a dispersion polymerization technique.

In the systems containing pigments and polymers, the pigments and polymers may form multiple domains within the electrophoretic particle, or be aggregates of smaller pigment/polymer combined particles. Alternatively, a central pigment core may be surrounded by a polymer shell. The pigment, polymer, or both can contain a dye. The optical purpose of the particle may be to scatter light, absorb light, or both. Useful sizes may range from 1 nm up to about 100 μm, as long as the particles are smaller than the bounding capsule. In a preferred embodiment, the density of the electrophoretic particle may be substantially matched to that of the suspending (i.e., electrophoretic) fluid. As defined herein, a suspending fluid has a density that is "substantially matched" to the density of the particle if the difference in their respective densities is between about zero and about two g/ml. This difference is preferably between about zero and about 0.5 g/ml.

Useful polymers for the particles include, but are not limited to: polystyrene, polyethylene, polypropylene, phenolic resins, Du Pont Elvax resins (ethylene-vinyl acetate copolymers), polyesters, polyacrylates, polymethacrylates, ethylene acrylic acid or methacrylic acid copolymers (Nucrel Resins—DuPont, Primacor Resins—Dow Chemical), acrylic copolymers and terpolymers (Elvacite Resins, DuPont) and PMMA. Useful materials for homopolymer/pigment phase separation in high shear melt include, but are not limited to, polyethylene, polypropylene, polymethylmethacrylate, polyisobutylmethacrylate, polystyrene, polybutadiene, polyisoprene, polyisobutylene, polylauryl methacrylate, polystearyl methacrylate, polyisobornyl methacrylate, poly-tbutyl methacrylate, polyethyl methacrylate, polymethyl acrylate, polyethyl acrylate, polyacrylonitrile, and copolymers of two or more of these materials. Some useful pigment/polymer complexes that are commercially available include, but are not limited to, Process Magenta PM 1776 (Magruder Color Company, Inc., Elizabeth, N.J.), Methyl Violet PMA VM6223 (Magruder Color Company, Inc., Elizabeth, N.J.), and Naphthol FGR RF6257 (Magruder Color Company, Inc., Elizabeth, N.J.).

The pigment-polymer composite may be formed by a physical process, (e.g., attrition or ball milling), a chemical process (e.g., microencapsulation or dispersion polymerization), or any other process known in the art of particle production. From the following non-limiting examples, it may be seen that the processes and materials for both the fabrication of particles and the charging thereof are generally derived from the art of liquid toner, or liquid immersion development. Thus any of the known processes from liquid development are particularly, but not exclusively, relevant.

New and useful electrophoretic particles may still be discovered, but a number of particles already known to those skilled in the art of electrophoretic displays and liquid toners can also prove useful. In general, the polymer requirements for liquid toners and encapsulated electrophoretic inks are similar, in that the pigment or dye must be easily incorporated therein, either by a physical, chemical, or physicochemical process, may aid in the colloidal stability, and may contain charging sites or may be able to incorporate materials which contain charging sites. One general requirement from the liquid toner industry that is not shared by encapsulated electrophoretic inks is that the toner must be capable of "fixing" the image, i.e., heat fusing together to create a uniform film after the deposition of the toner particles.

Typical manufacturing techniques for particles are drawn from the liquid toner and other arts and include ball milling, attrition, jet milling, etc. The process will be illustrated for the case of a pigmented polymeric particle. In such a case the pigment is compounded in the polymer, usually in some kind of high shear mechanism such as a screw extruder. The composite material is then (wet or dry) ground to a starting size of around 10 μm. It is then dispersed in a carrier liquid, for example ISOPAR® (Exxon, Houston, Tex.), optionally with some charge control agent(s), and milled under high shear for several hours down to a final particle size and/or size distribution.

Another manufacturing technique for particles drawn from the liquid toner field is to add the polymer, pigment, and suspending fluid to a media mill. The mill is started and simultaneously heated to temperature at which the polymer swells substantially with the solvent. This temperature is typically near 100° C. In this state, the pigment is easily encapsulated into the swollen polymer. After a suitable time, typically a few hours, the mill is gradually cooled back to ambient temperature while stirring. The milling may be continued for some time to achieve a small enough particle size, typically a few microns in diameter. The charging agents may be added at this time. Optionally, more suspending fluid may be added.

Chemical processes such as dispersion polymerization, mini- or micro-emulsion polymerization, suspension polymerization precipitation, phase separation, solvent evaporation, in situ polymerization, seeded emulsion polymerization, or any process which falls under the general category of microencapsulation may be used. A typical process of this type is a phase separation process wherein a dissolved polymeric material is precipitated out of solution onto a dispersed pigment surface through solvent dilution, evaporation, or a thermal change. Other processes include chemical means for staining polymeric latices, for example with metal oxides or dyes.

B. Suspending Fluid

The suspending fluid containing the particles can be chosen based on properties such as density, refractive index, and solubility. A preferred suspending fluid has a low dielectric constant (about 2), high volume resistivity (about $10^{15}$ ohm-cm), low viscosity (less than 5 cst), low toxicity and environmental impact, low water solubility (less than 10 ppm), high specific gravity (greater than 1.5), a high boiling point (greater than 90° C.), and a low refractive index (less than 1.2).

The choice of suspending fluid may be based on concerns of chemical inertness, density matching to the electrophoretic particle, or chemical compatibility with both the electrophoretic particle and bounding capsule. The viscosity of the fluid should be low when you want the particles to move. The refractive index of the suspending fluid may also be substantially matched to that of the particles. As used herein, the refractive index of a suspending fluid "is substantially matched" to that of a particle if the difference between their respective refractive indices is between about zero and about 0.3, and is preferably between about 0.05 and about 0.2.

Additionally, the fluid may be chosen to be a poor solvent for some polymers, which is advantageous for use in the fabrication of microparticles because it increases the range of polymeric materials useful in fabricating particles of polymers and pigments. Organic solvents, such as halogenated organic solvents, saturated linear or branched hydrocarbons, silicone oils, and low molecular weight halogen-containing polymers are some useful suspending fluids. The suspending fluid may comprise a single fluid. The fluid will, however, often be a blend of more than one fluid in order to tune its chemical and physical properties. Furthermore, the fluid may contain surface modifiers to modify the surface energy or charge of the electrophoretic particle or bounding capsule. Reactants or solvents for the microencapsulation process (oil soluble monomers, for example) can also be contained in the suspending fluid. Charge control agents can also be added to the suspending fluid.

Useful organic solvents include, but are not limited to, epoxides, such as, for example, decane epoxide and dodecane epoxide; vinyl ethers, such as, for example, cyclohexyl vinyl ether and Decave® (International Flavors & Fragrances, Inc., New York, N.Y.); and aromatic hydrocarbons, such as, for example, toluene and naphthalene. Useful halogenated organic solvents include, but are not limited to, tetrafluorodibromoethylene, tetrachloroethylene, trifluorochloroethylene, 1,2,4-trichlorobenzene, carbon tetrachloride. These materials have high densities. Useful hydrocarbons include, but are not limited to, dodecane, tetradecane, the aliphatic hydrocarbons in the Isopar® series (Exxon, Houston, Tex.), Norpar® (series of normal paraffinic liquids), Shell-Sol® (Shell, Houston, Tex.), and Sol-Trol® (Shell), naphtha, and other petroleum solvents. These materials usually have low densities. Useful examples of silicone oils include, but are not limited to, octamethyl cyclosiloxane and higher molecular weight cyclic siloxanes, poly (methyl phenyl siloxane), hexamethyldisiloxane, and polydimethylsiloxane. These materials usually have low densities. Useful low molecular weight halogen-containing polymers include, but are not limited to, poly(chlorotrifluoroethylene) polymer (Halogenated hydrocarbon Inc., River Edge, N.J.), Galden® (a perfluorinated ether from Ausimont, Morristown, N.J.), or Krytox® from DuPont (Wilmington, Del.). In a preferred embodiment, the suspending fluid is a poly(chlorotrifluoroethylene) polymer. In a particularly preferred embodiment, this polymer has a degree of polymerization from about 2 to about 10. Many of the above materials are available in a range of viscosities, densities, and boiling points.

The fluid must be capable of being formed into small droplets prior to a capsule being formed. Processes for forming small droplets include flow-through jets, membranes, nozzles, or orifices, as well as shear-based emulsifying schemes. The formation of small drops may be assisted by electrical or sonic fields. Surfactants and polymers can be used to aid in the stabilization and emulsification of the droplets in the case of an emulsion type encapsulation. A preferred surfactant for use in displays of the invention is sodium dodecylsulfate.

It can be advantageous in some displays for the suspending fluid to contain an optically absorbing dye. This dye must be soluble in the fluid, but will generally be insoluble in the other components of the capsule. There is much flexibility in the choice of dye material. The dye can be a pure compound, or blends of dyes to achieve a particular color, including black. The dyes can be fluorescent, which would produce a display in which the fluorescence properties depend on the position of the particles. The dyes can be photoactive, changing to another color or becoming colorless upon irradiation with either visible or ultraviolet light, providing another means for obtaining an optical response. Dyes could also be polymerizable, forming a solid absorbing polymer inside the bounding shell.

There are many dyes that can be chosen for use in encapsulated electrophoretic display. Properties important here include light fastness, solubility in the suspending liquid, color, and cost. These are generally from the class of azo, anthraquinone, and triphenylmethane type dyes and may be chemically modified so as to increase the solubility in the oil phase and reduce the adsorption by the particle surface.

A number of dyes already known to those skilled in the art of electrophoretic displays will prove useful. Useful azo dyes include, but are not limited to: the Oil Red dyes, and the Sudan Red and Sudan Black series of dyes. Useful anthraquinone dyes include, but are not limited to: the Oil Blue dyes, and the Macrolex Blue series of dyes. Useful triphenylmethane dyes include, but are not limited to, Michter's hydrol, Malachite Green, Crystal Violet, and Auramine O.

C. Charge Control Agents and Particle Stabilizers

Charge control agents are used to provide good electrophoretic mobility to the electrophoretic particles. Stabilizers are used to prevent agglomeration of the electrophoretic particles, as well as prevent the electrophoretic particles from irreversibly depositing onto the capsule wall. Either component can be constructed from materials across a wide range of molecular weights (low molecular weight, oligomeric, or polymeric), and may be pure or a mixture. In particular, suitable charge control agents are generally adapted from the liquid toner art. The charge control agent used to modify and/or stabilize the particle surface charge is applied as generally known in the arts of liquid toners, electrophoretic displays, non-aqueous paint dispersions, and engine-oil additives. In all of these arts, charging species may be added to non-aqueous media in order to increase electrophoretic mobility or increase electrostatic stabilization. The materials can improve steric stabilization as well. Different theories of charging are postulated, including selective ion adsorption, proton transfer, and contact electrification.

An optional charge control agent or charge director may be used. These constituents typically consist of low molecular weight surfactants, polymeric agents, or blends of one or more components and serve to stabilize or otherwise modify the sign and/or magnitude of the charge on the electrophoretic particles. The charging properties of the pigment itself may be accounted for by taking into account the acidic or basic surface properties of the pigment, or the charging sites may take place on the carrier resin surface (if present), or a combination of the two.

Additional pigment properties which may be relevant are the particle size distribution, the chemical composition, and the lightfastness. The charge control agent used to modify and/or stabilize the particle surface charge is applied as generally known in the arts of liquid toners, electrophoretic displays, non-aqueous paint dispersions, and engine-oil additives. In all of these arts, charging species may be added to non-aqueous media in order to increase electrophoretic mobility or increase electrostatic stabilization. The materials can improve steric stabilization as well. Different theories of charging are postulated, including selective ion adsorption, proton transfer, and contact electrification.

Charge adjuvants may also be added. These materials increase the effectiveness of the charge control agents or charge directors. The charge adjuvant may be a polyhydroxy compound or an aminoalcohol compound, which are preferably soluble in the suspending fluid in an amount of at least 2% by weight. Examples of polyhydroxy compounds which contain at least two hydroxyl groups include, but are not limited to, ethylene glycol, 2,4,7,9-tetramethyl-decyne-4,7-diol, poly(propylene glycol), pentaethylene glycol, tripropylene glycol, triethylene glycol, glycerol, pentaerythritol, glycerol tris(12-hydroxystearate), propylene glycerol monohydroxystearate, and ethylene glycol monohydroxystrearate. Examples of aminoalcohol compounds which contain at least one alcohol function and one amine function in the same molecule include, but are not limited to, triisopropanolamine, triethanolamine, ethanolamine, 3-amino-1-propanol, o-aminophenol, 5-amino-1-pentanol, and tetrakis (2-hydroxyethyl)ethylene-diamine. The charge adjuvant is preferably present in the suspending fluid in an amount of about 1 to about 100 mg/g of the particle mass, and more preferably about 50 to about 200 mg/g.

The surface of the particle may also be chemically modified to aid dispersion, to improve surface charge, and to improve the stability of the dispersion, for example. Surface modifiers include organic siloxanes, organohalogen silanes and other functional silane coupling agents (Dow Corning® Z-6070, Z-6124, and 3 additive, Midland, Mich.); organic titanates and zirconates (Tyzor® TOT, TBT, and TE Series, DuPont, Wilmington, Del.); hydrophobing agents, such as long chain (C12 to C50) alkyl and alkyl benzene sulphonic acids, fatty amines or diamines and their salts or quaternary derivatives; and amphipathic polymers which can be covalently bonded to the particle surface.

In general, it is believed that charging results as an acid-base reaction between some moiety present in the continuous phase and the particle surface. Thus useful materials are those which are capable of participating in such a reaction, or any other charging reaction as known in the art.

Different non-limiting classes of charge control agents which are useful include organic sulfates or sulfonates, metal soaps, block or comb copolymers, organic amides, organic zwitterions, and organic phosphates and phosphonates. Useful organic sulfates and sulfonates include, but are not limited to, sodium bis(2-ethyl hexyl) sulfosuccinate, calcium dodecyl benzene sulfonate, calcium petroleum sulfonate, neutral or basic barium dinonyinaphthalene sulfonate, neutral or basic calcium dinonyinaphthalene sulfonate, dodecylbenzenesulfonic acid sodium salt, and ammonium lauryl sulphate. Useful metal soaps include, but are not limited to, basic or neutral barium petronate, calcium petronate, Co—, Ca—, Cu—, Mn—, Ni—, Zn—, and Fesalts of naphthenic acid, Ba—, Al—, Zn—, Cu—, Pb—, and Fe— salts of stearic acid, divalent and trivalent metal carboxylates, such as aluminum tristearate, aluminum octoanate, lithium heptanoate, iron stearate, iron distearate, barium stearate, chromium stearate, magnesium octanoate, calcium stearate, iron naphthenate, and zinc naphthenate, Mn— and Zn— heptanoate, and Ba—, Al—, Co—, Mn—, and Zn— octanoate. Useful block or comb copolymers include, but are not limited to, AB diblock copolymers of (A) polymers of 2-(N,N)-dimethylaminoethyl methacrylate quaternized with methyl-p-toluenesulfonate and (B) poly-2-ethylhexyl methacrylate, and comb graft copolymers with oil soluble tails of poly (12-hydroxystearic acid) and having a molecular weight of about 1800, pendant on an oil-soluble anchor group of poly (methyl methacrylate-methacrylic acid). Useful organic amides include, but are not limited to, polyisobutylene succinimides such as OLOA 1200 and 3700, and N-vinyl pyrrolidone polymers. Useful organic zwitterions include, but are not limited to, lecithin. Useful organic phosphates and phosphonates include, but are not limited to, the sodium salts of phosphated mono- and di-glycerides with saturated and unsaturated acid substituents.

Particle dispersion stabilizers may be added to prevent particle flocculation or attachment to the capsule walls. For the typical high resistivity liquids used as suspending fluids in electrophoretic displays, nonaqueous surfactants may be used. These include, but are not limited to, glycol ethers, acetylenic glycols, alkanolamides, sorbitol derivatives, alkyl amines, quaternary amines, imidazolines, dialkyl oxides, and sulfosuccinates.

D. Encapsulation

Liquids and particles can be encapsulated, for example, within a membrane or in a binder material. Moreover, there is a long and rich history to encapsulation, with numerous processes and polymers having proven useful in creating capsules. Encapsulation of the internal phase may be accomplished in a number of different ways. Numerous suitable procedures for microencapsulation are detailed in both Microencapsulation, Processes and Applications, (I. E. Vandegaer, ed.), Plenum Press, New York, N.Y. (1974) and Gutcho, Microcapsules and Mircroencapsulation Techniques, Nuyes Data Corp., Park Ridge, N.J. (1976). The processes fall into several general categories, all of which can be applied to the present invention: interfacial polymerization, in situ polymerization, physical processes, such as coextrusion and other phase separation processes, in-liquid curing, and simple/complex coacervation.

Numerous materials and processes should prove useful in formulating displays of the present invention. Useful materials for simple coacervation processes include, but are not limited to, gelatin, polyvinyl alcohol, polyvinyl acetate, and cellulosic derivatives, such as, for example, carboxymethylcellulose. Useful materials for complex coacervation processes include, but are not Limited to, gelatin, acacia, carageenan, carboxymethylcellulose, hydrolyzed styrene anhydride copolymers, agar, alginate, casein, albumin, methyl vinyl ether co-maleic anhydride, and cellulose phthalate. Useful materials for phase separation processes include, but are not limited to, polystyrene, PMMA, polyethyl methacrylate, polybutyl methacrylate, ethyl cellulose, polyvinyl pyridine, and poly acrylonitrile. Useful materials for in situ polymerization processes include, but are not limited to, polyhydroxyamides, with aldehydes, melamine, or urea and formaldehyde; water-soluble oligomers of the condensate of melamine, or urea and formaldehyde; and vinyl monomers, such as, for example, styrene, MMA and acrylonitrile. Finally, useful materials for interfacial polymerization processes include, but are not limited to, diacyl chlorides, such as, for example, sebacoyl, adipoyl, and di- or poly-amines or alcohols, and isocyanates. Useful emulsion polymerization materials may include, but are not limited to, styrene, vinyl acetate, acrylic acid, butyl acrylate, t-butyl acrylate, methyl methacrylate, and butyl methacrylate.

Capsules produced may be dispersed into a curable carrier, resulting in an ink which may be printed or coated on large and arbitrarily shaped or curved surfaces using conventional printing and coating techniques.

In the context of the present invention, one skilled in the art will select an encapsulation procedure and wall material based on the desired capsule properties. These properties include the distribution of capsule radii; electrical, mechanical, diffusion, and optical properties of the capsule wall; and chemical compatibility with the internal phase of the capsule.

The capsule wall generally has a high electrical resistivity. Although it is possible to use walls with relatively low resistivities, this may limit performance in requiring relatively higher addressing voltages. The capsule wall should also be mechanically strong (although if the finished capsule powder is to be dispersed in a curable polymeric binder for coating, mechanical strength is not as critical). The capsule wall should generally not be porous. If, however, it is desired to use an encapsulation procedure that produces porous capsules, these can be overcoated in a post-processing step (i.e., a second encapsulation). Moreover, if the capsules are to be dispersed in a curable binder, the binder will serve to close the pores. The capsule walls should be optically clear. The wall material may, however, be chosen to match the refractive index of the internal phase of the capsule (i.e., the suspending fluid) or a binder in which the capsules are to be dispersed. For some applications (e.g., interposition between two fixed electrodes), monodispersed capsule radii are desirable.

An encapsulation procedure involves a polymerization between urea and formaldehyde in an aqueous phase of an oil/water emulsion in the presence of a negatively charged, carboxyl-substituted, linear hydrocarbon polyelectrolyte material. The resulting capsule wall is a urea/formaldehyde copolymer, which discretely encloses the internal phase. The capsule is clear, mechanically strong, and has good resistivity properties.

The related technique of in situ polymerization utilizes an oil/water emulsion, which is formed by dispersing the electrophoretic composition (i.e., the dielectric liquid containing a suspension of the pigment particles) in an aqueous environment. The monomers polymerize to form a polymer with higher affinity for the internal phase than for the aqueous phase, thus condensing around the emulsified oily droplets. In one especially useful in situ polymerization processes, urea and formaldehyde condense in the presence of poly (acrylic acid) (See, e.g., U.S. Pat. No. 4,001,140). In other useful process, any of a variety of cross-linking agents borne in aqueous solution is deposited around microscopic oil droplets. Such cross-linking agents include aldehydes, especially formaldehyde, glyoxal, or glutaraldehyde; alum; zirconium salts; and poly isocyanates. The entire disclosures of the U.S. Pat. Nos. 4,001,140 and 4,273,672 are hereby incorporated by reference herein.

The coacervation approach also utilizes an oil/water emulsion. One or more colloids are coacervated (i.e., agglomerated) out of the aqueous phase and deposited as shells around the oily droplets through control of temperature, pH and/or relative concentrations, thereby creating the microcapsule. Materials suitable for coacervation include gelatins and gum arabic.

The interfacial polymerization approach relies on the presence of an oil-soluble monomer in the electrophoretic composition, which once again is present as an emulsion in an aqueous phase. The monomers in the minute hydrophobic droplets react with a monomer introduced into the aqueous phase, polymerizing at the interface between the droplets and the surrounding aqueous medium and forming shells around the droplets. Although the resulting walls are relatively thin and may be permeable, this process does not require the elevated temperatures characteristic of some other processes, and therefore affords greater flexibility in terms of choosing the dielectric liquid.

Coating aids can be used to improve the uniformity and quality of the coated or printed electrophoretic ink material. Wetting agents are typically added to adjust the interfacial tension at the coating/substrate interface and to adjust the liquid/air surface tension. Wetting agents include, but are not limited to, anionic and cationic surfactants, and nonionic species, such as silicone or fluoropolymer based materials. Dispersing agents may be used to modify the interfacial tension between the capsules and binder, providing control over flocculation and particle settling.

Surface tension modifiers can be added to adjust the air/ink interfacial tension. Polysiloxanes are typically used in such an application to improve surface Leveling while minimizing other defects within the coating. Surface tension modifiers include, but are not limited to, fluorinated surfactants, such as, for example, the Zonyl® series from DuPont (Wilmington, Del.), the Fluorod® series from 3M (St. Paul, Minn.), and the fluoroakyl series from Autochem (Glen Rock, N.J.); siloxanes, such as, for example, Silwet® from Union Carbide (Danbury, Conn.); and polyethoxy and polypropoxy alcohols. Antifoams, such as silicone and silicone-free polymeric materials, may be added to enhance the movement of air from within the ink to the surface and to facilitate the rupture of bubbles at the coating surface. Other useful antifoams include, but are not limited to, glyceryl esters, polyhydric alcohols, compounded antifoams, such as oil solutions of alkyl benzenes, natural fats, fatty acids, and metallic soaps, and silicone antifoaming agents made from the combination of dimethyl siloxane polymers and silica. Stabilizers such as uv-absorbers and antioxidants may also be added to improve the lifetime of the ink.

Other additives to control properties like coating viscosity and foaming can also be used in the coating fluid. Stabilizers (UV-absorbers, antioxidants) and other additives which could prove useful in practical materials.

E. Binder Material

The binder is used as a non-conducting, adhesive medium supporting and protecting the capsules, as well as binding the electrode materials to the capsule dispersion. Binders are available in many forms and chemical types. Among these are water-soluble polymers, water-borne polymers, oil-soluble polymers, thermoset and thermoplastic polymers, and radiation-cured polymers.

Among the water-soluble polymers are the various polysaccharides, the polyvinyl alcohols, N-methylpyrrolidone, N-vinylpyrrollidone, the various Carbowax® species (Union Carbide, Danbury, Conn.), and poly-2-hydroxyethylacrylate.

The water-dispersed or water-borne systems are generally latex compositions, typified by the Neorez® and Neocryl® resins (Zeneca Resins, Wilmington, Mass.), Acrysol® (Rohm and Haas, Philadelphia, Pa.), Bayhydrol® (Bayer, Pittsburgh, Pa.), and the Cytec Industries (West Paterson, N.J.) HP line. These are generally latices of polyurethanes, occasionally compounded with one or more of the acrylics, polyesters, polycarbonates or silicones, each lending the final cured resin in a specific set of properties defined by glass transition temperature, degree of "tack," softness, clarity, flexibility, water permeability and solvent resistance, elongation modulus and tensile strength, thermoplastic flow, and solids level. Some water-borne systems can be mixed with reactive monomers and catalyzed to form more complex resins. Some can be further cross-linked by the use of a crosslinking reagent, such as an aziridine, for example, which reacts with carboxyl groups.

A typical application of a water-borne resin and aqueous capsules follows. A volume of particles is centrifuged at low speed to separate excess water. After a given centrifugation process, for example 10 minutes at 60×G, the capsules are found at the bottom of the centrifuge tube, while the water portion is at the top. The water portion is carefully removed (by decanting or pipetting). The mass of the remaining capsules is measured, and a mass of resin is added such that the mass of resin is between one eighth and one tenth of the weight of the capsules. This mixture is gently mixed on an oscillating mixer for approximately one half hour. After about one half hour, the mixture is ready to be coated onto the appropriate substrate.

The thermoset systems are exemplified by the family of epoxies. These binary systems can vary greatly in viscosity, and the reactivity of the pair determines the "pot life" of the mixture. If the pot life is long enough to allow a coating operation, capsules may be coated in an ordered arrangement in a coating process prior to the resin curing and hardening.

Thermoplastic polymers, which are often polyesters, are molten at high temperatures. A typical application of this type of product is hot-melt glue. A dispersion of heat-resistant capsules could be coated in such a medium. The solidification process begins during cooling, and the final hardness, clarity and flexibility are affected by the branching and molecular weight of the polymer.

Oil or solvent-soluble polymers are often similar in composition to the water-borne system, with the obvious exception of the water itself. The latitude in formulation for solvent systems is enormous, limited only by solvent choices and polymer solubility. Of considerable concern in solvent-based systems is the viability of the capsule itself—the integrity of the capsule wall cannot be compromised in any way by the solvent.

Radiation cure resins are generally found among the solvent-based systems. Capsules may be dispersed in such a medium and coated, and the resin may then be cured by a timed exposure to a threshold level of very violet radiation, either long or short wavelength. As in all cases of curing polymer resins, final properties are determined by the branching and molecular weights of the monomers, oligomers and crosslinkers.

A number of "water-reducible" monomers and oligomers are, however, marketed. In the strictest sense, they are not water soluble, but water is an acceptable diluent at low concentrations and can be dispersed relatively easily in the mixture. Under these circumstances, water is used to reduce the viscosity (initially from thousands to hundreds of thousands centipoise). Water-based capsules, such as those made from a protein or polysaccharide material, for example, could be dispersed in such a medium and coated, provided the viscosity could be sufficiently lowered. Curing in such systems is generally by ultraviolet radiation.

While the invention has been particularly shown and described with reference to specific preferred embodiments, it should be understood by those skilled in the art that various changes in form and detail may be made therein without departing from the spirit and scope of the invention as described throughout this specification. For example, addressing architectures of the invention can be used in a variety of displays, for example, displays with electrophoretic or rotating ball media, and with encapsulated or unencapsulated media. For example, the number of subframes of a frame may be greater or fewer than described in the illustrative examples, and the number of digits of an addressing impulse data unit may be greater or fewer than described in the illustrative examples.

What is claimed is:

1. An addressing structure for addressing a display medium, the structure comprising:
   a plurality of column electrodes, each of the column electrodes being connected via switch means to a plurality of pixel electrodes;
   a plurality of voltage sources each having a different voltage level; and
   a switch unit having a plurality of voltage source inputs each connected to one of the plurality of voltage sources, and a plurality of outputs each connected to one of the plurality of column electrodes, the switch unit being capable of connecting each of the column electrodes independently to selected ones of the plurality of voltage sources, the switch unit further comprising a blanking signal input arranged to receive a blanking signal, the switch unit being arranged so that, upon receipt of the blanking signal, all column electrodes are connected to the same voltage source.

2. An addressing structure according to claim 1 wherein the switch unit further comprises at least one display signal input arranged to receive a display signal specifying the voltages to be placed upon the column electrodes, and the switch unit is arranged to connect each of the column electrodes independently to selected ones of the plurality of voltage sources dependent upon the display signal.

3. An addressing structure according to claim 2 wherein the switch unit comprises one display signal input for each column electrode and the switch unit is arranged to connect each column electrode to a selected one of the plurality of voltage sources dependent upon the display signal received by the display signal input associated with the column electrode.

4. An addressing structure for addressing a display medium, the structure comprising:
 a plurality of column electrodes, each of the column electrodes being connected via switch means to a plurality of pixel electrodes;
 a plurality of voltage sources each having a different voltage level; and
 a switch unit having a plurality of voltage source inputs each connected to one of the plurality of voltage sources, and a plurality of outputs each connected to one of the plurality of column electrodes, the switch unit being capable of connecting each of the column electrodes independently to selected ones of the plurality of voltage sources, the switch unit further comprising at least one display signal input arranged to receive a display signal specifying the voltages to be placed upon the column electrodes, and the switch unit is arranged to connect each of the column electrodes independently to selected ones of the plurality of voltage sources dependent upon the display signal, the addressing structure further comprising a data register for receiving sequentially data representing voltages to be applied to each of the column electrodes, and for storing said data, and data latching means for receiving said data from the data register, the at least one display signal input being connected to the data latching means.

5. An addressing structure for addressing a display medium, the structure comprising:
 a plurality of column electrodes, each of the column electrodes being connected via switch means to a plurality of pixel electrodes;
 a plurality of voltage sources each having a different voltage level; and
 a switch unit having a plurality of voltage source inputs each connected to one of the plurality of voltage sources, and a plurality of outputs each connected to one of the plurality of column electrodes, the switch unit being capable of connecting each of the column electrodes independently to selected ones of the plurality of voltage sources,
 the switch unit further comprising a plurality of multiplexing units, one multiplexing unit being connected to each column electrode, each multiplexing unit comprising a number of switches equal to the number of voltage sources inputs of the switch unit, each switch being capable of connecting its associated column electrode to its associated voltage source input, the multiplexing units being arranged to that, in each multiplexing unit only one of the switches is closed at any given time, all the other switches being open.

6. An addressing structure for addressing a display medium, the structure comprising:
 a plurality of column electrodes, each of the column electrodes being connected via switch means to a plurality of pixel electrodes;
 a plurality of voltage sources each having a different voltage level; and
 a switch unit having a plurality of voltage source inputs each connected to one of the plurality of voltage sources, and a plurality of outputs each connected to one of the plurality of column electrodes, the switch unit being capable of connecting each of the column electrodes independently to selected ones of the plurality of voltage sources,
 the switch unit further comprising a primary switch unit, a plurality of voltage rails, a plurality of secondary switch units each having an output connected to one column electrode, and sequencing means, the primary switch unit having voltage source inputs connected to the voltage source inputs of the switch unit, voltage rail outputs each connected to one voltage rail, and at least one control signal input arranged to receive a primary switch unit control signal from the sequencing means, each secondary switch unit having voltage rail inputs connected to each of the voltage rails and a control signal input arranged to receive a secondary switch unit control signal from the sequencing means, the sequencing means controlling the primary switch unit so that the voltage rails are connected to a first subset of the voltage source inputs of the primary switch unit during a first period, and to a second subset, different from said first subset, of the voltage source inputs of the primary switch unit during a second period, and each of the secondary switch units being arranged to connect their associated column electrode to a selected one of the voltage rails dependent upon the secondary switch unit control signal.

7. An addressing structure according to claim 6 wherein one voltage rail is maintained at the same voltage during the first and second periods.

8. An addressing structure according to claim 7 having at least three voltage rails, a first voltage rail maintained at the same voltage during the first and second periods, a second voltage rail maintained positive with respect to the first voltage rail during the first and second periods, and a third voltage rail maintained negative with respect to the first voltage rail during the first and second periods.

9. An addressing structure according to claim 6 wherein the sequencing means is arranged to receive a digital display signal comprising a plurality of digits defining the voltages to be applied to a given column electrode, and the sequencing means controls the secondary switch units such that the signal applied to that column electrode during the first period is defined by one digit of the digital display signal and the signal applied to that column electrode during the second period is defined by a second digit of the digital display signal.

10. An addressing structure according to claim 6 wherein the voltage sources comprise a voltage source having a central voltage at which the voltage rail is maintained during the first and second periods, a predetermined number of voltages greater than the central voltage and the same predetermined number of voltages less than the central voltage.

11. An addressing structure according to claim 10 wherein the differences between the central voltage and the predetermined number of voltages greater than the central voltage form a geometric series 1, 2, 4 etc. and the differences between the central voltage and the predetermined number of voltages less than the central voltage form a similar geometric series.

12. An electro-optic display comprising:
 a transparent substrate bearing a single transparent common electrode;
 an addressing structure according to claim 1; and an electro-optic medium disposed between the pixel electrodes of the addressing structure and the common electrode, the common electrode extending across all the pixels of the display.

13. An electro-optic display comprising:
a transparent substrate bearing a single transparent common electrode;
an addressing structure according to claim 6; and
an electro-optic medium disposed between the pixel electrodes of the addressing structure and the common electrode, the common electrode extending across all the pixels of the display.

14. A method for addressing a display medium, the method comprising:
providing a plurality of voltage sources each having a different voltage level;
providing a plurality of column electrodes, each of the column electrodes being connected via switch means to a plurality of pixel electrodes, the pixel electrodes being arranged to apply electric fields to pixels of the display medium;
providing a switch unit having a plurality of voltage source inputs each connected to one of the plurality of voltage sources, and a plurality of outputs each connected to one of the plurality of column electrodes, the switch unit further comprising a display signal input arranged to receive a display signal, and a blanking signal input,
by means of the switch unit, connecting each of the column electrodes independently to selected ones of the voltage sources, the voltage source connected to each column electrode being controlled by the display signal; and
supplying a blanking signal to the blanking signal input and thereby causing the switch unit to connect all the column electrodes to the same voltage source.

15. A method according to claim 14 comprising receiving in a data register data representing the voltages to be applied to each of the column electrodes, storing said data in said data register, transferring said data to a data latching means, and generating the display signal dependent upon the data in the data latching means.

16. A method for addressing a display medium, the method comprising:
providing a plurality of voltage sources each having a different voltage level;
providing a plurality of column electrodes, each of the column electrodes being connected via switch means to a plurality of pixel electrodes, the pixel electrodes being arranged to apply electric fields to pixels of the display medium;
providing a switch unit having a plurality of voltage source inputs each connected to one of the plurality of voltage sources, and a plurality of outputs each connected to one of the plurality of column electrodes, the switch unit further comprising a display signal input arranged to receive a display signal, the switch unit further comprising a primary switch unit, a plurality of voltage rails, a plurality of secondary switch units each having an output connected to one column electrode, and sequencing means, the primary switch unit having voltage source inputs connected to the voltage source inputs of the switch unit, voltage rail outputs each connected to one voltage rail, and at least one control signal input arranged to receive a primary switch unit control signal from the sequencing means, each secondary switch unit having voltage rail inputs connected to each of the voltage rails and a control signal input arranged to receive a secondary switch unit control signal from the sequencing means,
by means of the switch unit, connecting each of the column electrodes independently to selected ones of the voltage sources, the voltage source connected to each column electrode being controlled by the display signal,
the method further comprising (a) during a first period, sending a first signal from the sequencing means to the primary switch unit so that the voltage rails are connected to a first subset of the voltage source inputs of the primary switch unit, and during the same first period sending second signals from , and to a second subset, different from said first subset, of the voltage source inputs of the primary switch unit during a second period, and each of the secondary switch units being arranged to connect their associated column electrode to a selected one of the voltage rails dependent upon the secondary switch unit control signal.

* * * * *